(12) United States Patent
Tanaka et al.

(10) Patent No.: US 12,476,502 B2
(45) Date of Patent: Nov. 18, 2025

(54) ROTOR, IPM MOTOR INCLUDING SAME, AND ROTOR MANUFACTURING METHOD

(71) Applicant: NIDEC CORPORATION, Kyoto (JP)

(72) Inventors: Yosuke Tanaka, Kyoto (JP); Takeshi Honda, Kyoto (JP); Hirofumi Muto, Kyoto (JP); Hideki Tsuji, Kyoto (JP); Yuya Danjo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 249 days.

(21) Appl. No.: 18/473,280

(22) Filed: Sep. 25, 2023

(65) Prior Publication Data

US 2024/0113576 A1      Apr. 4, 2024

(30) Foreign Application Priority Data

Sep. 29, 2022   (JP) ................................ 2022-155727

(51) Int. Cl.
*H02K 1/27*       (2022.01)
*H02K 1/276*      (2022.01)
*H02K 15/03*      (2006.01)

(52) U.S. Cl.
CPC ............. *H02K 1/276* (2013.01); *H02K 15/03* (2013.01)

(58) Field of Classification Search
CPC .... H02K 1/276; H02K 15/03; H02K 2213/03; H02K 1/2766
See application file for complete search history.

(56) References Cited

U.S. PATENT DOCUMENTS

| | | | |
|---|---|---|---|
| 9,979,246 B2 * | 5/2018 | Helbling | H02K 1/276 |
| 2015/0108866 A1 | 4/2015 | Kaiser et al. | |
| 2020/0106314 A1 * | 4/2020 | Schulde | H02K 1/276 |

FOREIGN PATENT DOCUMENTS

| | | |
|---|---|---|
| DE | 102005041676 A1 | 3/2007 |
| JP | 5221030 B2 | 6/2013 |
| JP | 2013126330 A | 6/2013 |
| JP | 6714907 B2 | 7/2020 |

* cited by examiner

*Primary Examiner* — Thomas Truong
(74) *Attorney, Agent, or Firm* — HAUPTMAN HAM, LLP

(57) ABSTRACT

A rotor includes core plates, a hole, and a magnet in the hole. The core plates include a first core plate and a second core plate frontward of the first core plate. The first core plate includes a first hole, a first protrusion protruding inward of the first hole, and a first portion located in an opposite direction to a protrusion direction of the first protrusion as viewed from the axial direction and permitting deformation of the first protrusion in the opposite direction. The second core plate includes a second hole, and at least one of a recess recessed in the opposite direction and overlapping the first protrusion as viewed in the axial direction, or a second portion located in the opposite direction with respect to the first protrusion as viewed in the axial direction and permitting deformation of an inner surface of the second hole in the opposite direction.

9 Claims, 14 Drawing Sheets

OPPOSITE DIRECTION ← → PROTRUSION DIRECTION

OPPOSITE DIRECTION ← → PROTRUSION DIRECTION

ROTOR, IPM MOTOR INCLUDING SAME, AND ROTOR MANUFACTURING METHOD

CROSS-REFERENCE TO RELATED APPLICATIONS

The present invention claims priority under 35 U.S.C. § 119 to Japanese Patent Application No. 2022-155727 filed on Sep. 29, 2022, the entire content of which is incorporated herein by reference.

FIELD OF THE INVENTION

The present invention relates to a rotor, an IPM motor, and a rotor manufacturing method.

BACKGROUND

There is a known rotor in which a magnet is inserted into a magnet insertion hole, the rotor configured that a part of an inner surface of the magnet insertion hole pushes the magnet toward the inside of the magnet insertion hole to hold the magnet in the magnet insertion hole. For example, conventionally, there is a known core of a rotating electrical machine in which a plurality of core plates each having an insertion hole is stacked, a permanent magnet is inserted into the insertion hole, a bridge portion between an outer peripheral portion of the core plate and an inner edge of the insertion hole is deformed on the permanent magnet side, and the bridge portion pushes the permanent magnet.

In the conventional configuration, the rotor holds the magnet inserted into the magnet insertion hole by a convex portion protruding from the inner surface of the magnet insertion hole. However, when the magnet is inserted into the magnet insertion hole, the magnet pushes a protrusion portion as the convex portion into the magnet insertion direction, so that a tip end portion of the protrusion portion may be plastically deformed into a state of being bent in the magnet insertion direction and held between the magnet and the magnet insertion hole. In a case where the tip end portion of the protrusion portion is held between the magnet and the magnet insertion hole, there is a possibility that the protrusion portion fails to appropriately hold the magnet. Such failing to appropriately hold the magnet may cause a decrease in the holding force of the magnet, damage of the magnet, and the like.

Therefore, for a rotor that holds a magnet inserted into a magnet insertion hole by a protrusion portion, a configuration that can appropriately hold the magnet is required.

SUMMARY

A rotor according to an embodiment of the present invention is a rotor including: a rotor core in a columnar shape having a plurality of core plates stacked in a thickness direction and a magnet insertion hole extending in an axial direction; and a magnet inserted into the magnet insertion hole. The plurality of core plates include a first core plate, and a second core plate stacked frontward in a magnet insertion direction in which the magnet is inserted into the magnet insertion hole with respect to of the first core plate. The first core plate includes a first insertion through hole penetrating the first core plate in a thickness direction to constitute a part of the magnet insertion hole, a first protrusion portion protruding toward an inside of the first insertion through hole, and a first deformation permission portion located in a position in an opposite direction to a protrusion direction of the first protrusion portion with respect to the first protrusion portion when the rotor core is viewed from the axial direction and permits deformation of the first protrusion portion in the opposite direction. The second core plate includes a second insertion through hole penetrating the second core plate in a thickness direction to constitute a part of the magnet insertion hole, and at least one of a recess portion recessed in the opposite direction in a position overlapping the first protrusion portion when the rotor core is viewed from the axial direction, and a second deformation permission portion that is located at a position in the opposite direction with respect to the first protrusion portion when the rotor core is viewed from the axial direction and permits an inner surface of the second insertion through hole to be deformed in the opposite direction.

An IPM motor according to an embodiment of the present invention includes a rotor having the above configuration and a stator having a stator coil and a stator core.

A rotor manufacturing method according to an embodiment of the present invention is a manufacturing method of a rotor including a rotor core in a columnar shape having a plurality of core plates stacked in a thickness direction and a magnet insertion hole extending in an axial direction, and a magnet inserted into the magnet insertion hole. The manufacturing method of a rotor includes: a first core plate forming process of forming a first core plate by forming, on a steel plate, a first insertion through hole penetrating the steel plate in a thickness direction to constitute a part of the magnet insertion hole, a first protrusion portion protruding toward an inside of the first insertion through hole, and a first deformation permission portion located in a position in an opposite direction to a protrusion direction of the first protrusion portion with respect to the first protrusion portion when the steel plate is viewed from the thickness direction and permitting deformation of the first protrusion portion in the opposite direction; a second core plate forming process of forming a second core plate by forming, on a steel plate, a second insertion through hole penetrating the steel plate in a thickness direction to constitute a part of the magnet insertion hole, and at least one of a recess portion recessed in the opposite direction in a position overlapping the first protrusion portion when the rotor core is viewed in the axial direction and a second deformation permission portion located in a position in the opposite direction with respect to the first protrusion portion when the rotor core is viewed in the axial direction and permitting an inner surface of the second insertion through hole to be deformed in the opposite direction; a stacking process of stacking the second core plate frontward in a magnet insertion direction that is a direction in which the magnet is inserted into the magnet insertion hole with respect to the first core plate; and a magnet inserting process of inserting the magnet into the magnet insertion hole constituted with the first core plate and the second core plate and holding the magnet in contact with the first protrusion portion of the first core plate.

The above and other elements, features, steps, characteristics and advantages of the present disclosure will become more apparent from the following detailed description of the preferred embodiments with reference to the attached drawings.

DETAILED DESCRIPTION

Figure 1:
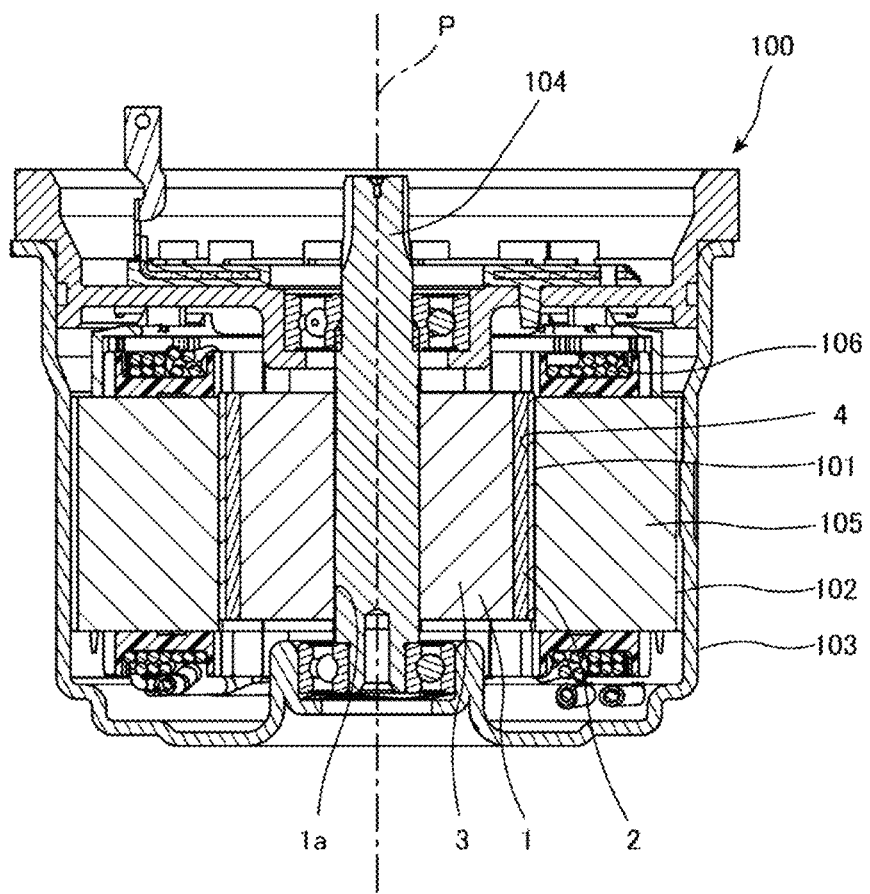
FIG. 1 is a sectional view showing a schematic configuration of a motor according to a first embodiment.

Hereinafter, exemplary embodiments of the present invention will be described with reference to the drawings. In the respective drawings, identical or corresponding portions are denoted with identical reference signs; therefore, the description thereof will not be given repeatedly. In addition, the respective drawings do not faithfully show the dimensions of actual constituent members, the dimensional ratios of the constituent members, and the like.

Hereinafter, in the description of a motor 100, a direction parallel to a center axis P of a rotor 101 is referred to as axial direction, a direction orthogonal to the center axis P is referred to as radial direction, and a direction along an arc about the center axis P is referred to as circumferential direction.

In the following description, a direction in which a magnet 2 is inserted into a magnet insertion hole 4 is referred to as magnet insertion direction. White arrows in the drawings indicate the magnet insertion direction. The magnet insertion direction is the same as the axial direction. However, these definitions are not intended to limit the orientation of the rotor 101 at the time of manufacturing and at the time of use.

In the following description, the term "same" is not limited to a case of being exactly the same, and may be the same as long as it includes a range that can be regarded as being substantially the same and to an extent of exhibiting the effect of the invention.

In the following description, expressions such as "fixed", "connected", and "attached" include not only cases where members are directly fixed to each other but also cases where members are fixed to each other via another member. That is, in the following description, the expressions of "fix" and the like include the meaning of direct and indirect fixation and the like of members.

An exemplary IPM motor according to the first embodiment will be described with reference to FIG. 1. Hereinafter, the IPM motor is referred to as the motor 100.

As shown in FIG. 1, the motor 100 includes the rotor 101, a stator 102, a housing 103, and a shaft 104. The rotor 101 rotates about the center axis P with respect to the stator 102. In the present embodiment, the motor 100 is what is called an inner rotor type motor in which the rotor 101 is located in the stator 102 having a tubular shape rotatably about the center axis P.

The rotor 101 includes a rotor core 1 and the magnet 2. The rotor 101 is located radially inward of the stator 102 and is rotatable with respect to the stator 102 about the center axis P.

The stator 102 is accommodated in the housing 103. In the present embodiment, the stator 102 has a cylindrical shape. The rotor 101 is located radially inward of the stator 102. That is, the stator 102 is located to oppose the rotor 101 in the radial direction.

The stator 102 includes a stator core 105 and a stator coil 106. The stator coil 106 is wound around the stator core 105. Since the stator 102 has a known stator configuration, a detailed description thereof will be omitted.

Figure 2:
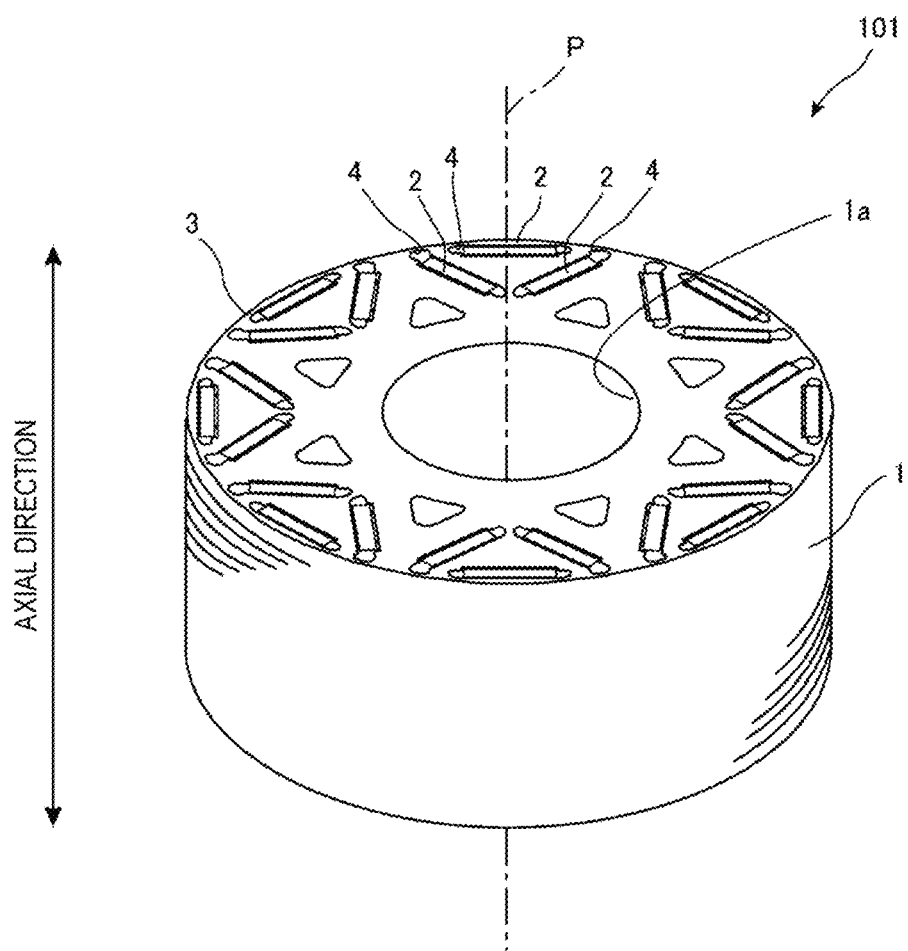
FIG. 2 is a perspective view of a rotor according to the first embodiment.

As shown in FIG. 2, the rotor 101 has a columnar shape extending along the center axis P. The rotor 101 includes the rotor core 1 and a plurality of the magnets 2. Hereinafter, a case where the rotor 101 includes one rotor core 1 will be described as an example. The rotor may be configured by axially stacking a plurality of rotor core blocks having the same configuration as the rotor core described in the present embodiment.

As shown in FIG. 2, the rotor core 1 has a shaft insertion hole 1a extending along the center axis P. As shown in FIG. 1, the shaft 104 is fixed in a state of penetrating the shaft insertion hole 1a in the axial direction. Due to this, the rotor core 1 rotates together with the shaft 104.

The rotor core 1 has a columnar shape and includes a plurality of core plates 3 and a plurality of the magnet insertion holes 4. The plurality of core plates 3 are stacked in the thickness direction. The magnet insertion hole 4 extends in the axial direction. Each of the core plates 3 is a disk-shaped electromagnetic steel plate formed in a predetermined shape.

The plurality of magnet insertion holes 4 are located at predetermined intervals in the circumferential direction. The plurality of magnet insertion holes 4 penetrate the rotor core 1 in the axial direction. The plurality of magnet insertion holes 4 have a rectangular elongated in one direction as viewed from the axial direction. The plurality of magnet insertion holes 4 include a magnet insertion hole 4 whose long direction is along the outer periphery of the rotor core 1 as viewed from the axial direction, and a magnet insertion hole 4 extending from the radially outer peripheral side to the radially inner peripheral side of the rotor core 1 as viewed from the axial direction. The magnet 2 is accommodated in the magnet insertion hole 4. The plurality of magnet insertion holes 4 may include the magnet insertion hole 4 extending in the radial direction of the rotor core 1 as viewed from the axial direction.

The magnet 2 has a cuboid shape and extends in the axial direction. The magnet 2 is accommodated in the magnet insertion hole 4. Specifically, the magnet 2 is inserted in the magnet insertion direction, which is a direction in which the magnet 2 is inserted from one side in the axial direction of the rotor 101, and is accommodated in the magnet insertion hole 4. The magnet 2 is fixed to the magnet insertion hole 4 by a first protrusion portion 52 of a first core plate 5 described later.

Figure 3:
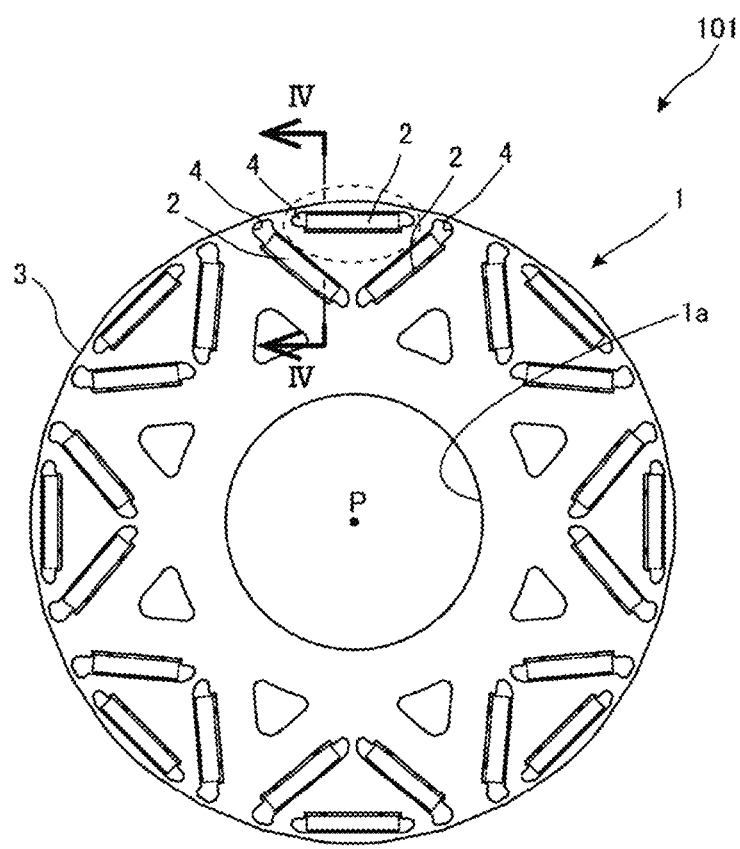
FIG. 3 is a view of a rotor as viewed from an axial direction.
Figure 4:
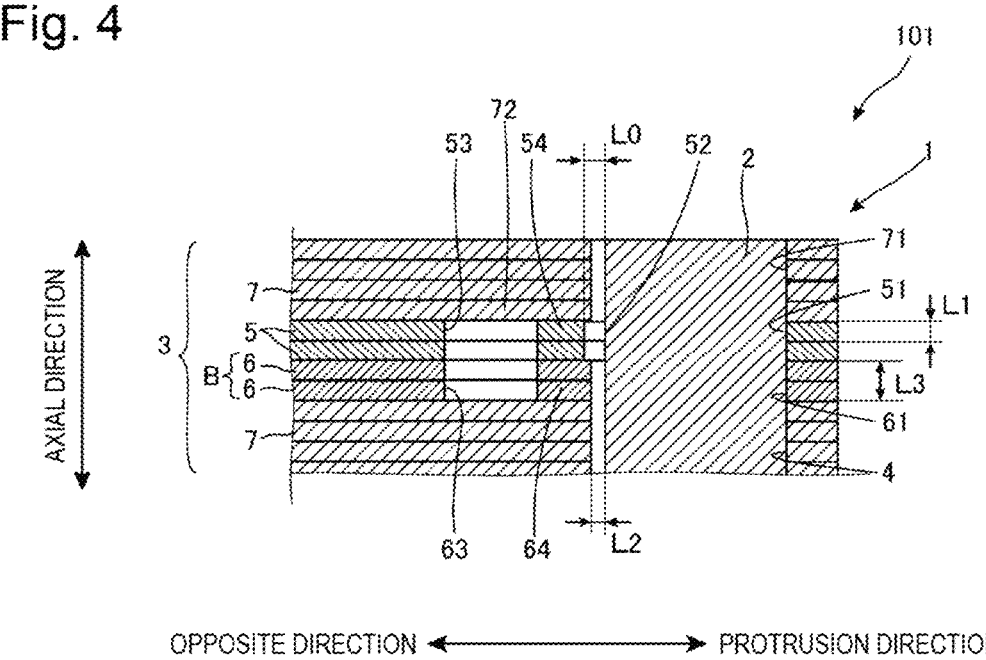
FIG. 4 is a sectional view taken along line IV-IV of FIG. 3.

FIG. 3 is a view of the rotor 101 as viewed from the axial direction. FIG. 4 is a sectional view taken along line IV-IV in FIG. 3. As shown in FIG. 4, the plurality of stacked core plates 3 include the first core plate 5, a second core plate 6, and a basic core plate 7.

As shown in FIG. 4, in the present embodiment, the rotor core 1 includes a plurality of the first core plates 5, a plurality of the second core plates 6, and a plurality of the basic core plates 7. The plurality of first core plates 5, the plurality of second core plates 6, and the plurality of basic core plates 7 are stacked in the order of the plurality of basic core plates 7, the plurality of first core plates 5, the plurality of second core plates 6, and the plurality of basic core plates 7 from the rear side toward the front side in the magnet insertion direction, which is a direction in which the magnet 2 is inserted into the magnet insertion hole 4. That is, in the present embodiment, the plurality of second core plates 6 are stacked frontward in the magnet insertion direction with respect to the first core plate 5 located on the foremost side in the magnet insertion direction among the plurality of first core plates 5. One second core plate 6 may be stacked frontward in the magnet insertion direction with respect to the first core plate 5.

One or the plurality of second core plates 6 stacked frontward in the magnet insertion direction with respect to the first core plate 5 constitute a second core plate stacked portion B. That is, the rotor core 1 includes the second core plate stacked portion B in which one or the plurality of second core plates 6 are stacked. In the present embodiment, the second core plate stacked portion B includes two second core plates 6.

As shown in FIG. 4, a gap having a gap dimension L2 is generated between the magnet 2 accommodated in the magnet insertion hole 4 and the inner surface of the magnet insertion hole 4 on the side where the first protrusion portion 52 is located.

Figure 5:
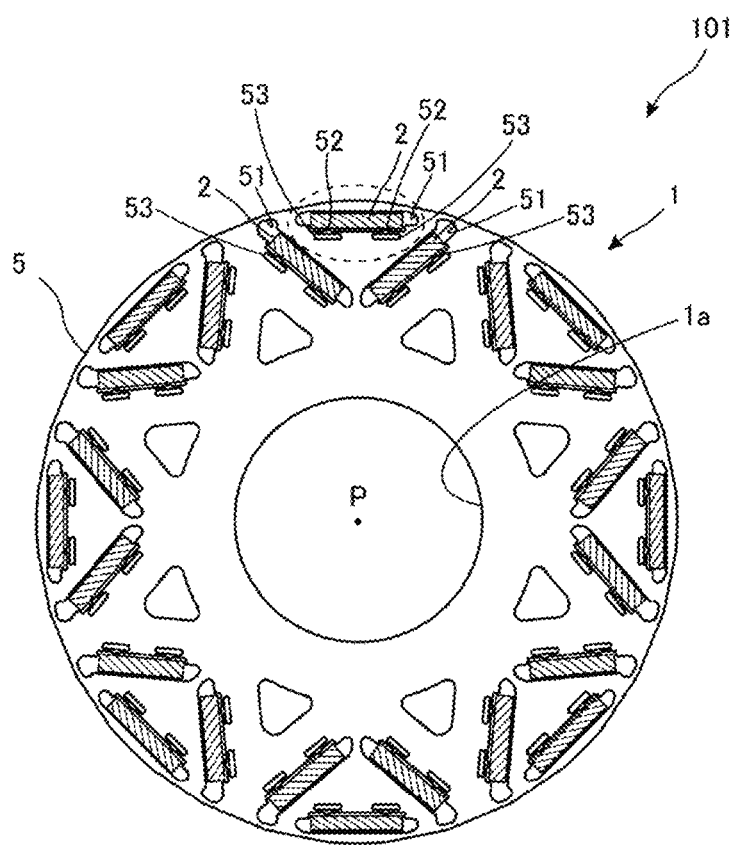
FIG. 5 is a view of a first core plate according to the first embodiment as viewed from the axial direction.
Figure 6:
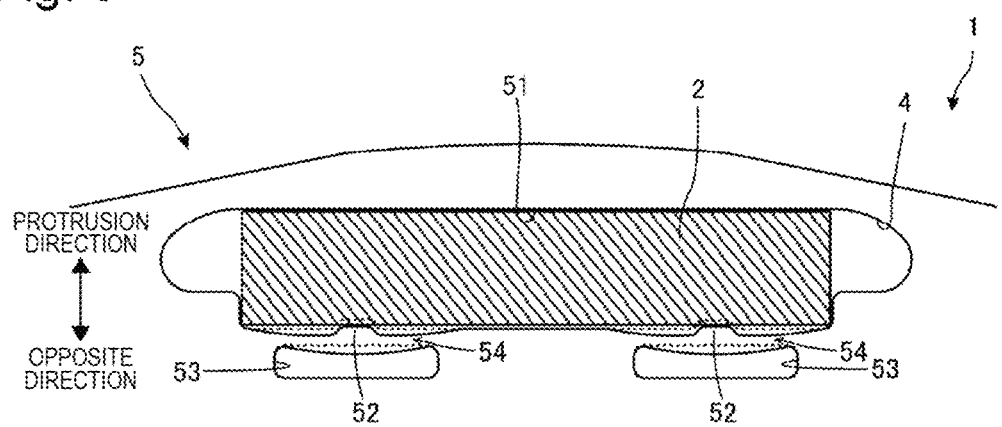
FIG. 6 is an enlarged view of a first insertion through hole and a first deformation permission portion of the first core plate.
Figure 7:
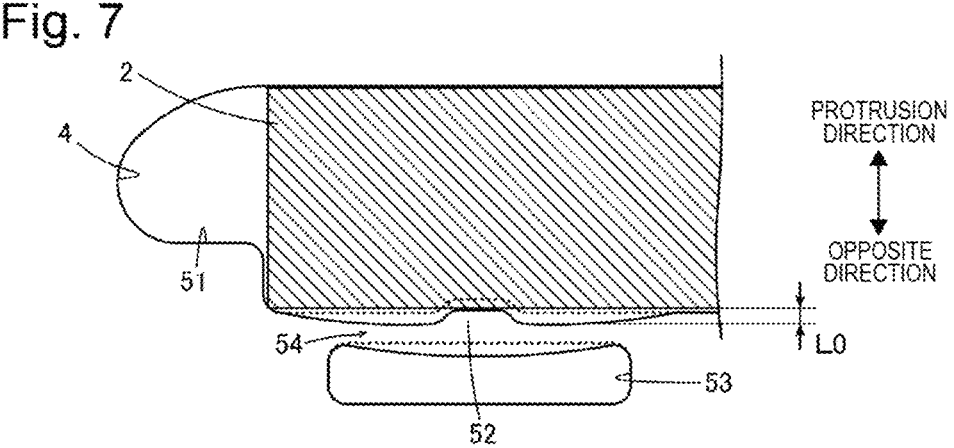
FIG. 7 is an enlarged view of the first deformation permission portion.

An example of the first core plate 5 according to the first embodiment will be described with reference to FIGS. 5 to 7. As shown in FIGS. 5 and 6, the first core plate 5 includes a plurality of first insertion through holes 51, a plurality of first protrusion portions 52, a plurality of first deformation permission portions 53, and a plurality of first deformation portions 54. FIG. 5 shows the first core plate 5 viewed from the axial direction. FIG. 6 is an enlarged view of the first insertion through hole 51 and the first deformation permission portion 53 of the first core plate 5. FIG. 7 is an enlarged view of the first deformation permission portion 53.

In the present embodiment, as shown in FIGS. 5 and 6, the first core plate 5 includes two first protrusion portions 52 and two first deformation permission portions 53 on the radially inner side of one first insertion through hole 51. The first core plate 5 includes two first deformation portions 54 on the radially inner side of the one first insertion through hole 51. In the plurality of first insertion through holes 51 in the same first core plate 5, the configurations of the two first protrusion portions 52, the two first deformation permission portions 53, and the two first deformation portions 54 with respect to the respective first insertion through holes 51 are the same. Therefore, the one first insertion through hole 51, and the first protrusion portion 52, the first deformation permission portion 53, and the first deformation portion 54 located with respect to the first insertion through hole 51 will be described below.

The first insertion through hole 51 penetrates the first core plate 5 in the thickness direction. The first insertion through hole 51 constitutes a part of the magnet insertion hole 4. The magnet 2 is located in the first insertion through hole 51. As shown in FIG. 6, the first insertion through hole 51 has a shape elongated in one direction as the first core plate 5 is viewed from the axial direction. In the example shown in FIG. 6, the first insertion through hole 51 has a shape elongated in one direction orthogonal to the radial direction as the first core plate 5 is viewed from the axial direction.

The first protrusion portion 52 protrudes from the inner surface of the first insertion through hole 51 toward the inside of the magnet insertion hole 4. The tip end portion of the first protrusion portion 52 in the protrusion direction is in contact with the magnet 2. The first protrusion portion 52 has a trapezoidal shape when the first core plate 5 is viewed from the axial direction. The two first protrusion portions 52 are located on the inner surface on the radially inner side of the inner surface extending in the long direction of the first insertion through hole 51.

As shown in FIGS. 4 and 7, the protrusion length of the first protrusion portion 52 is L0. As shown in FIG. 4, the thickness dimension of the first protrusion portion 52 is L1. The protrusion length means a length from the base end portion to the tip end portion of the first protrusion portion 52. In the present embodiment, the protrusion length L0 of the first protrusion portion 52 is smaller than the thickness dimension L1 of the first protrusion portion 52.

When the magnet 2 is not inserted into the magnet insertion hole 4 as viewed in the axial direction, the tip end portion of the first protrusion portion 52 protrudes in a region where the magnet 2 is accommodated in the magnet insertion hole 4. Therefore, when the magnet 2 is inserted into the magnet insertion hole 4, there is a possibility that the first protrusion portion 52 is pushed in the magnet insertion direction by the magnet 2 and is deformed in the magnet insertion direction. In the present embodiment, the protrusion length L0 of the first protrusion portion 52 is smaller than the thickness dimension L1 of the first protrusion portion 52. Due to this, the first protrusion portion 52 is suppressed from being deformed in the magnet insertion direction. The protrusion length L0 of the first protrusion portion may be larger than the thickness dimension L1 of the first protrusion portion as long as the protrusion length L0 is shorter than an axial length L3 of the second core plate stacked portion B described later.

The thickness dimension L1 of the first protrusion portion 52 is larger than a gap dimension L2 between the magnet 2 and the inner surface of the magnet insertion hole 4.

The first deformation permission portion 53 is located in a position in an opposite direction to the protrusion direction of the first protrusion portion 52 with respect to the first protrusion portion 52. In the present embodiment, the first deformation permission portion 53 is a through hole penetrating the first core plate 5 in the thickness direction. In the example shown in FIG. 6, the first deformation permission portion 53 is located radially inward with respect to the first insertion through hole 51. The first deformation permission portion 53 has a rectangular shape as the first core plate 5 is viewed from the axial direction. In the example of FIG. 6, the first deformation permission portion 53 has a shape elongated in a direction orthogonal to the protrusion direction.

As shown in FIG. 6, the first deformation permission portion 53 permits deformation of the first protrusion portion 52 in the opposite direction. Specifically, when the first protrusion portion 52 is pushed in the opposite direction by the magnet 2 inserted into the magnet insertion hole 4, the first deformation permission portion 53, which is a through hole, permits deformation of the first protrusion portion 52 in the opposite direction. In the present embodiment, the first deformation permission portion 53 is a through hole, but the first deformation permission portion only needs to have a configuration that permits deformation of the first protrusion portion in the opposite direction, and may have a thin shape, for example.

The first deformation portion 54 is located between the first protrusion portion 52 and the first deformation permission portion 53. Specifically, the first deformation portion 54 is a region of the first core plate 5 located between the first deformation permission portion 53 and the base end portion of the first protrusion portion 52.

Broken lines in FIGS. 6 and 7 indicate examples of shapes of the first protrusion portion 52, the first deformation permission portion 53, and the first deformation portion 54 when the magnet 2 is not inserted into the magnet insertion hole 4.

As indicated by broken lines in FIGS. 6 and 7, when the magnet 2 is not inserted into the magnet insertion hole 4 as viewed in the axial direction, the tip end portion of the first protrusion portion 52 protrudes to the region in which the magnet 2 is accommodated in the magnet insertion hole 4. Therefore, when the magnet 2 is inserted into the magnet insertion hole 4, the first protrusion portion 52 is pushed in the opposite direction by the magnet 2. The first deformation permission portion 53 is located in the opposite direction. When the first protrusion portion 52 is pushed in the opposite direction, the first deformation portion 54 located between the first protrusion portion 52 and the first deformation permission portion 53 is deformed in the opposite direction as indicated by broken lines in FIGS. 6 and 7. Due to this, the first protrusion portion 52 is displaced in the opposite direction together with the first deformation portion 54. Hereinafter, the displacement of the first protrusion portion 52 in the opposite direction and the deformation of the first deformation portion 54 in the opposite direction is also referred to as deformation of the first protrusion portion 52.

The restoring force of the first deformation portion 54 deformed in the opposite direction tries to move the first protrusion portion 52 in the protrusion direction. Therefore, in a state where the magnet 2 is inserted into the magnet insertion hole 4, the first protrusion portion 52 pushes the magnet 2 in the protrusion direction. Due to this, the magnet 2 is fixed with respect to the inner surface of the magnet insertion hole 4.

As shown in FIG. 4, the plurality of first insertion through holes 51 overlap one another as viewed from the axial direction. The plurality of first deformation permission portions 53 overlap one another as viewed from the axial direction. The plurality of first deformation portions 54 overlap one another as viewed from the axial direction. The first protrusion portions 52 of the plurality of first core plates 5 overlap one another as viewed from the axial direction.

An example of the second core plate 6 according to the first embodiment will be described with reference to FIGS. 4, 8, and 9.

The second core plate 6 includes a plurality of second insertion through holes 61, a plurality of second deformation permission portions 63, and a plurality of second deformation portions 64. The plurality of second insertion through holes 61, the plurality of second deformation permission portions 63, and the plurality of second deformation portions 64 are arranged at positions overlapping the plurality of first insertion through holes 51, the plurality of first deformation permission portions 53, and the plurality of first deformation portions 54 of the first core plate 5 as viewed in the axial direction. In the plurality of second insertion through holes 61, the configurations of two second deformation permission portions 63 and two second deformation portions 64 with respect to the respective second insertion through holes 61 are the same. The configurations of the plurality of second insertion through holes 61 are the same. Therefore, one second insertion through hole 61 and the second deformation permission portion 63 and the second deformation portion 64 located with respect to the second insertion through hole 61 will be described below.

Figure 8:
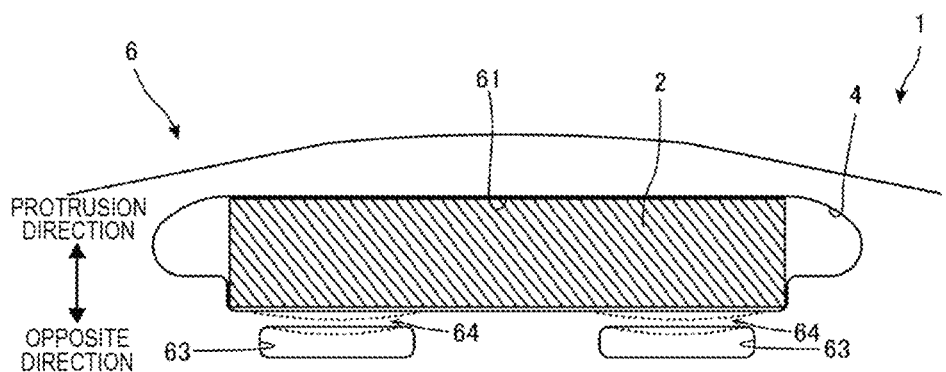
FIG. 8 is a partially enlarged view of a second core plate according to the first embodiment.
Figure 9:
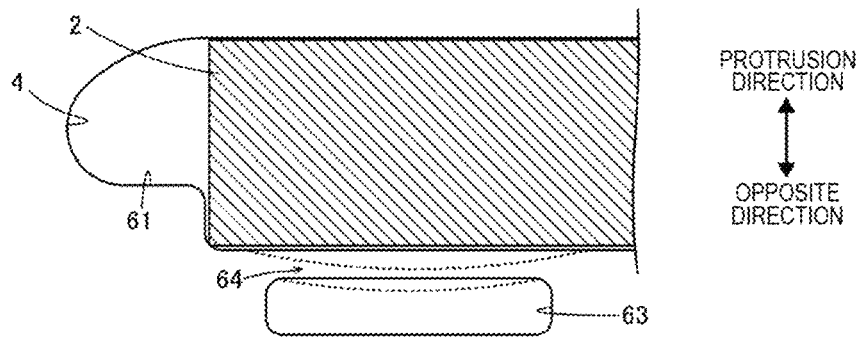
FIG. 9 is an enlarged view of a second deformation permission portion.

FIGS. 8 and 9 are views, as viewed from the axial direction, of a part of the second core plate 6 overlapping the first core plate 5 shown in FIGS. 6 and 7 in the axial direction. In the present embodiment, as shown in FIG. 8, the second core plate 6 includes the two second deformation permission portions 63 and the two second deformation portions 64 on the radially inner side of the one second insertion through hole 61. The second insertion through hole 61 penetrates the second core plate 6 in the thickness direction. The second insertion through hole 61 constitutes a part of the magnet insertion hole 4. The magnet 2 is located in the second insertion through hole 61. As shown in FIG. 8, the second insertion through hole 61 has a shape elongated in one direction as viewed from the axial direction. In the example shown in FIG. 8, the second insertion through hole 61 has a shape elongated in one direction orthogonal to the radial direction as viewed from the axial direction.

The second insertion through hole 61 is located in a position overlapping the first insertion through hole 51 as the rotor core 1 is viewed from the axial direction. Due to this, dies for punching the first core plate 5 and the second core plate 6 can be made common. Therefore, the number of types of dies for molding the plurality of core plates 3 can be reduced. Therefore, the productivity of the rotor 101 can be improved.

The second deformation permission portion 63 is located in the second core plate 6 in a position in the opposite direction with respect to the first protrusion portion 52. In the present embodiment, the second deformation permission portion 63 is a through hole penetrating the second core plate 6 in the thickness direction. In the example shown in FIG. 8, the second deformation permission portion 63 is located radially inward with respect to the second insertion through hole 61. The second deformation permission portion 63 has a rectangular shape as viewed from the axial direction. In the example of FIG. 8, the second deformation permission portion 63 has a shape elongated in a direction orthogonal to the protrusion direction.

The second deformation permission portion 63 permits the inner surface of the second insertion through hole 61 to be deformed in the opposite direction. Specifically, when the first protrusion portion 52 is pushed in the magnet insertion direction by the magnet 2 inserted into the magnet insertion hole 4, the first protrusion portion 52 is deformed in the magnet insertion direction and comes into contact with the inner surface of the second insertion through hole 61 of the second core plate 6. Due to this, the inner surface of the second insertion through hole 61 is pushed in the opposite direction. The second deformation permission portion 63, which is a through hole, permits deformation of the inner surface of the second insertion through hole 61 in the opposite direction. In the present embodiment, the second deformation permission portion 63 is a through hole, but the second deformation permission portion only needs to have a configuration that permits the inner surface of the second insertion through hole to be deformed in the opposite direction, and may have a thin shape, for example.

The second deformation permission portion 63 is located in a position overlapping the first deformation permission portion 53 of the first core plate 5 as the rotor core 1 is viewed from the axial direction. Due to this, even when the first protrusion portion 52 is deformed in the magnet insertion direction when the magnet 2 is inserted into the magnet insertion hole 4, the inner surface of the second insertion through hole 61 of the second core plate 6 as the rotor core 1 is viewed from the axial direction can be easily deformed in the opposite direction by the second deformation permission portion 63 of the second core plate 6. Therefore, it is possible to prevent the first protrusion portion 52 from strongly pushing the magnet 2 when the magnet 2 is inserted into the magnet insertion hole 4. Therefore, the magnet 2 can be appropriately held. Therefore, the magnet 2 can be prevented from being damaged.

The second deformation portion 64 is a region located between the inner surface of the second insertion through hole 61 and the second deformation permission portion 63. In the present embodiment, the second deformation portion 64 is located between the two through holes. The second deformation portion 64 is deformed in the opposite direction when the inner surface of the second insertion through hole 61 is pushed in the opposite direction. Broken lines in FIGS. 8 and 9 indicate examples of shapes of the second deformation permission portion 63 and the second deformation portion 64 when deformed.

The second deformation portion 64 deformed into the shape indicated by broken lines in FIGS. 8 and 9 has a restoring force returning to the shape indicated by solid line. That is, when deformed into the shape indicated by broken lines, the inner surface of the second insertion through hole 61 has a restoring force that moves in the protrusion direction.

As shown in FIG. 4, the axial length of the second core plate stacked portion B is L3. The axial length L3 of the second core plate stacked portion B is longer than the protrusion length L0 of the first protrusion portion 52. That is, the rotor core 1 includes the second core plate stacked portion B in which one or a plurality of second core plates 6 are stacked, and the protrusion length L0 of the first protrusion portion 52 is shorter than the axial length L3 of the second core plate stacked portion B.

When the magnet 2 is inserted into the magnet insertion hole 4, the first protrusion portion 52 of the first core plate 5 may be pushed in the magnet insertion direction by the magnet 2 and deformed in the magnet insertion direction. When deformed in the magnet insertion direction, the tip end portion of the first protrusion portion 52 comes into contact with the inner surface of the second insertion through hole 61 of the second core plate 6 stacked in the magnet insertion direction with respect to the first core plate 5. The first protrusion portion 52 is pushed by the magnet 2 also in an opposite direction to the protrusion direction of the first protrusion portion 52. In a state of being deformed in the magnet insertion direction, the first protrusion portion 52 pushed in the opposite direction pushes the inner surface of the second insertion through hole 61 in the opposite direction. The second insertion through hole 61 pushed in the opposite direction is deformed in the opposite direction. Therefore, the tip end portion of the first protrusion portion 52 is not held between the magnet 2 and the inner surface of the second insertion through hole 61 of the second core plate 6.

The protrusion length L0 of the first protrusion portion 52 is shorter than the axial length of the second core plate stacked portion B in which one or the plurality of second core plates 6 are stacked. Therefore, the tip end portion of the first protrusion portion 52 deformed in the magnet insertion direction is located rearward in the magnet insertion direction relative to the basic core plate 7 described later stacked in the magnet insertion direction with respect to the second core plate stacked portion B. Therefore, the tip end portion of the first protrusion portion 52 is not held between the magnet 2 and the inner surface of a basic insertion through hole 71 of the basic core plate 7. In this manner, the first protrusion portion 52 is not held between the magnet insertion hole 4 and the magnet 2. Therefore, the first protrusion portion 52 can be easily deformed in the opposite direction. Therefore, when the magnet 2 is inserted into the magnet insertion hole 4, the first protrusion portion 52 can be prevent from strongly pushing the magnet 2. Therefore, the magnet 2 can be appropriately held. Therefore, the magnet 2 can be prevented from being damaged.

As shown in FIG. 4, in the second core plate stacked portion B, the second insertion through holes 61 of the plurality of second core plates 6 overlap one another as viewed from the axial direction. The plurality of second deformation permission portions 63 overlap one another as viewed from the axial direction. The plurality of second deformation portions 64 overlap one another as viewed from the axial direction.

Figure 10:
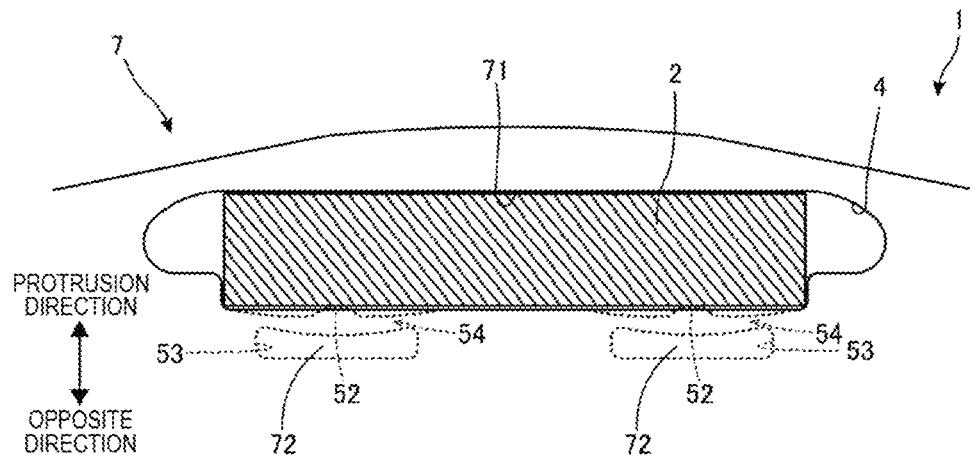
FIG. 10 is a partially enlarged view of a basic core plate according to the first embodiment.

An example of the basic core plate 7 according to the first embodiment will be described with reference to FIGS. 4 and 10. FIG. 10 is a view, as viewed in the axial direction, of a part of the basic core plate 7 stacked rearward in the magnet insertion direction with respect to the plurality of first core plates 5, the part overlapping the first core plate 5 shown in FIG. 6 as viewed in the axial direction. The plurality of basic core plates 7 each have the same configuration.

As shown in FIG. 10, the basic core plate 7 includes the basic insertion through hole 71 and a covering portion 72. The basic insertion through hole 71 constitutes a part of the magnet insertion hole 4. The magnet 2 is located in the basic insertion through hole 71. As shown in FIG. 8, the basic insertion through hole 71 has a shape elongated in one direction as viewed from the axial direction. In the example shown in FIG. 8, the basic insertion through hole 71 has a shape elongated in one direction orthogonal to the radial direction as viewed from the axial direction. The basic insertion through hole 71 is located in a position overlapping the first insertion through hole 51 of the first core plate 5 as viewed from the axial direction.

The covering portion 72 is located in a position overlapping the first protrusion portion 52, the first deformation permission portion 53, and the first deformation portion 54 of the first core plate 5 as the rotor core 1 is viewed from the axial direction. That is, the first protrusion portion 52, the first deformation permission portion 53, and the first deformation portion 54 of the first core plate 5 stacked adjacent to the basic core plate 7 in the axial direction are covered in the axial direction by the covering portion 72 of the basic core plate 7. The basic core plate 7 needs not include the covering portion 72.

The covering portion 72 is located in a position overlapping the second deformation permission portion 63 and the second deformation portion 64 of the second core plate 6 as the rotor core 1 is viewed from the axial direction. That is, the second deformation permission portion 63 and the second deformation portion 64 of the second core plate 6 stacked adjacent to the basic core plate 7 in the axial direction are covered in the axial direction by the covering portion 72 of the basic core plate 7.

As described above, in the present embodiment, the plurality of basic core plates 7 are continuously stacked. As shown in FIG. 4, the plurality of basic insertion through holes 71 overlap one another as viewed from the axial direction. The plurality of covering portions 72 overlap one another as viewed from the axial direction.

Next, the relationship between the first protrusion portion 52 of the first core plate 5 and the second deformation permission portion 63 of the second core plate 6 will be described in detail with reference to FIGS. 11 to 17. Hereinafter, for the sake of explanation, of two first core plates 5 stacked in the axial direction, each constituent element of the first core plate 5 on the rear side in the magnet insertion direction is denoted by reference sign a, and each constituent element of the first core plate 5 on the front side is denoted by reference sign b to distinguish the two first core plates 5. Similarly, of the two second core plates 6 stacked in the axial direction, each constituent element of the second core plate 6 on the rear side in the magnet insertion direction is denoted by reference sign a, and each constituent element of the second core plate 6 on the front side is denoted by reference sign b to distinguish the two second core plates 6.

Figure 11:
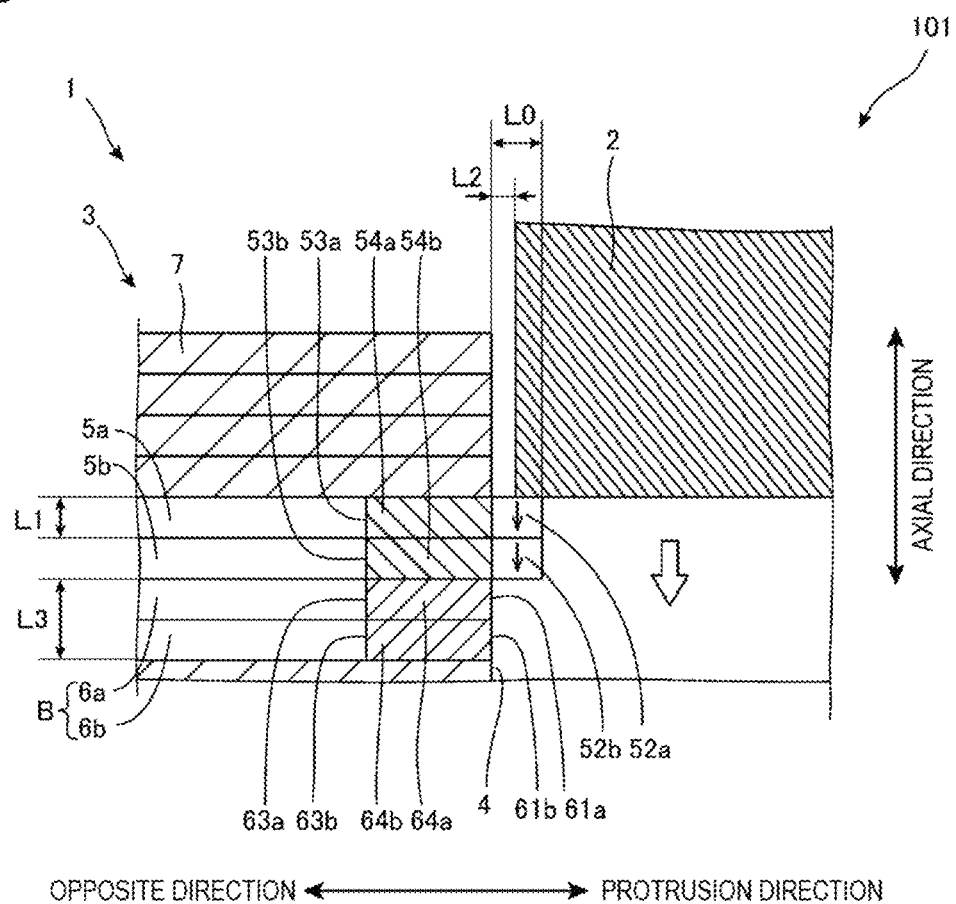
FIG. 11 is a view schematically showing a state in which a first protrusion portion is deformed when a magnet is inserted into a magnet insertion hole.

As shown in FIG. 11, first protrusion portions 52a and 52b of first core plates 5a and 5b protrude toward the inside of the magnet insertion hole 4. Therefore, when the magnet 2 is inserted into the magnet insertion hole 4, the first protrusion portion 52 is pushed in the magnet insertion direction by the magnet 2.

The first protrusion portion 52 is deformable in the magnet insertion direction or the direction in which the first deformation permission portion 53 is located, that is, an opposite direction to the protrusion direction of the first protrusion portion 52.

As shown in FIG. 11, in the present embodiment, the first protrusion portion 52a of the first core plate 5a that first comes into contact with the magnet 2 is suppressed from being deformed in the magnet insertion direction by the first protrusion portion 52b of the first core plate 5b stacked frontward in the magnet insertion direction with respect to the first core plate 5a. On the other hand, the first protrusion portion 52a is deformable in an opposite direction to the protrusion direction of the first protrusion portion 52a. Therefore, as shown in FIG. 12, the first protrusion portion 52a is deformed in the opposite direction.

Figure 12:
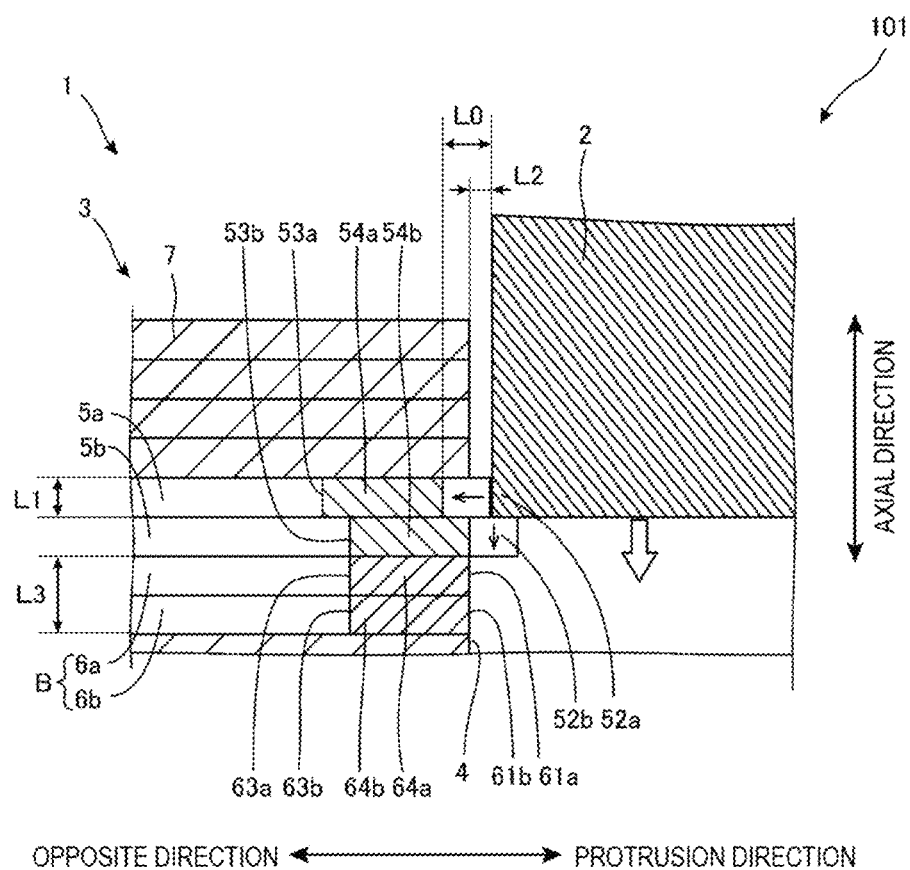
FIG. 12 is a view schematically showing a state in which the first protrusion portion is deformed when the magnet is inserted into the magnet insertion hole.
Figure 13:
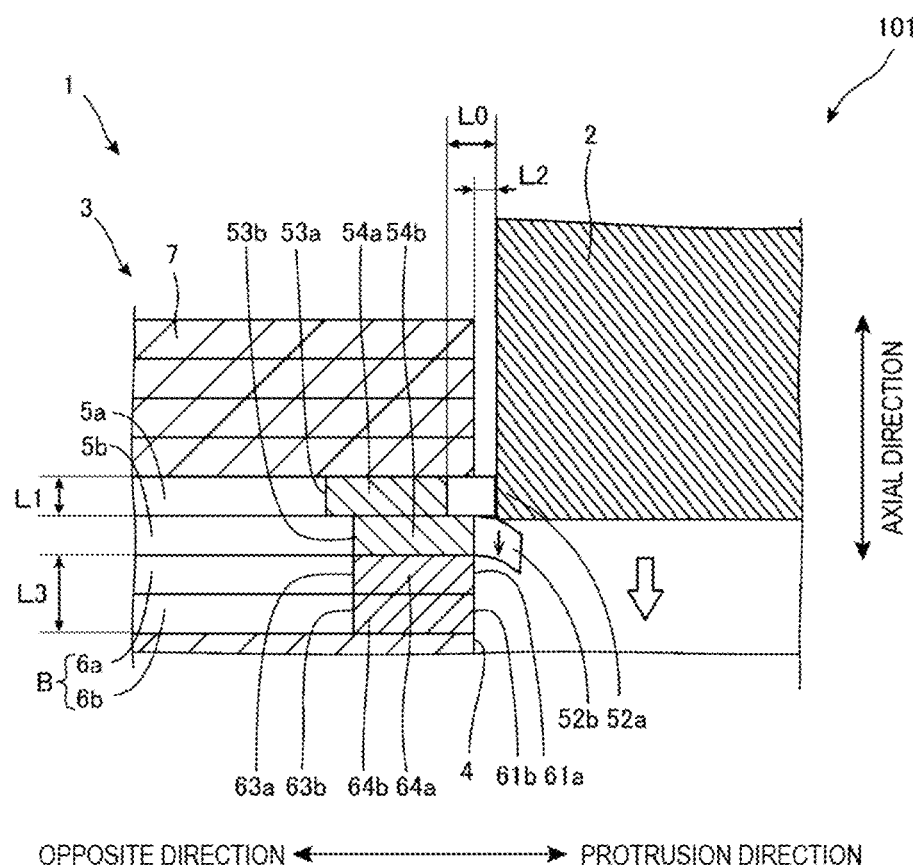
FIG. 13 is a view schematically showing a state in which the first protrusion portion is deformed when the magnet is inserted into the magnet insertion hole.
Figure 14:
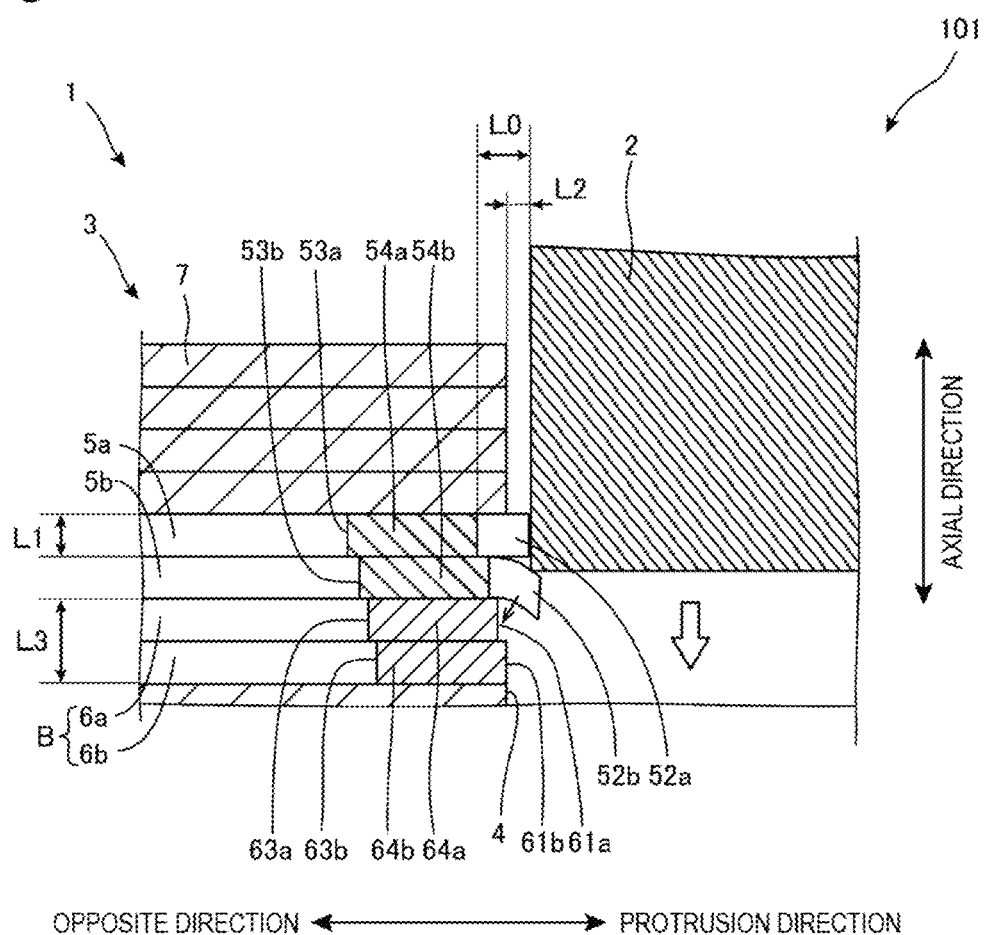
FIG. 14 is a view schematically showing a state in which the first protrusion portion is deformed when the magnet is inserted into the magnet insertion hole.

As shown in FIG. 12, in the magnet insertion hole 4, when the magnet 2 is further moved in the magnet insertion direction, the magnet 2 comes into contact with the first protrusion portion 52b of the first core plate 5b. As shown in FIG. 13, the first protrusion portion 52b of the first core plate 5b in contact with the magnet 2 may be deformed in the magnet insertion direction. As described above, the thickness dimension L1 of the first protrusion portion 52 is larger than the gap dimension L2 between the magnet 2 and the inner surface of the magnet insertion hole 4. Therefore, as shown in FIG. 14, the first protrusion portion 52b pushes, in the opposite direction, the inner surface of a second insertion through hole 61a of a second core plate 6a stacked frontward in the magnet insertion direction with respect to the first core plate 5b while being deformed in the magnet insertion direction.

Figure 15:
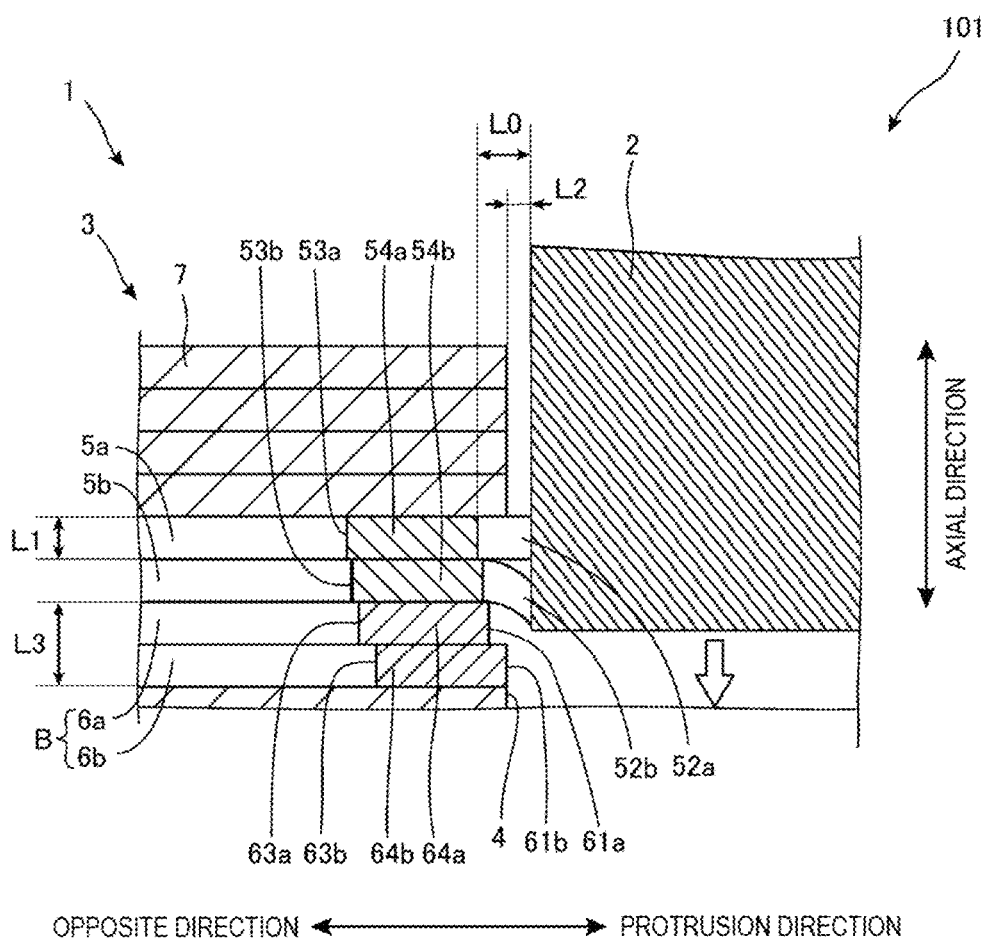
FIG. 15 is a view schematically showing a state in which the first protrusion portion is deformed when the magnet is inserted into the magnet insertion hole.
Figure 16:
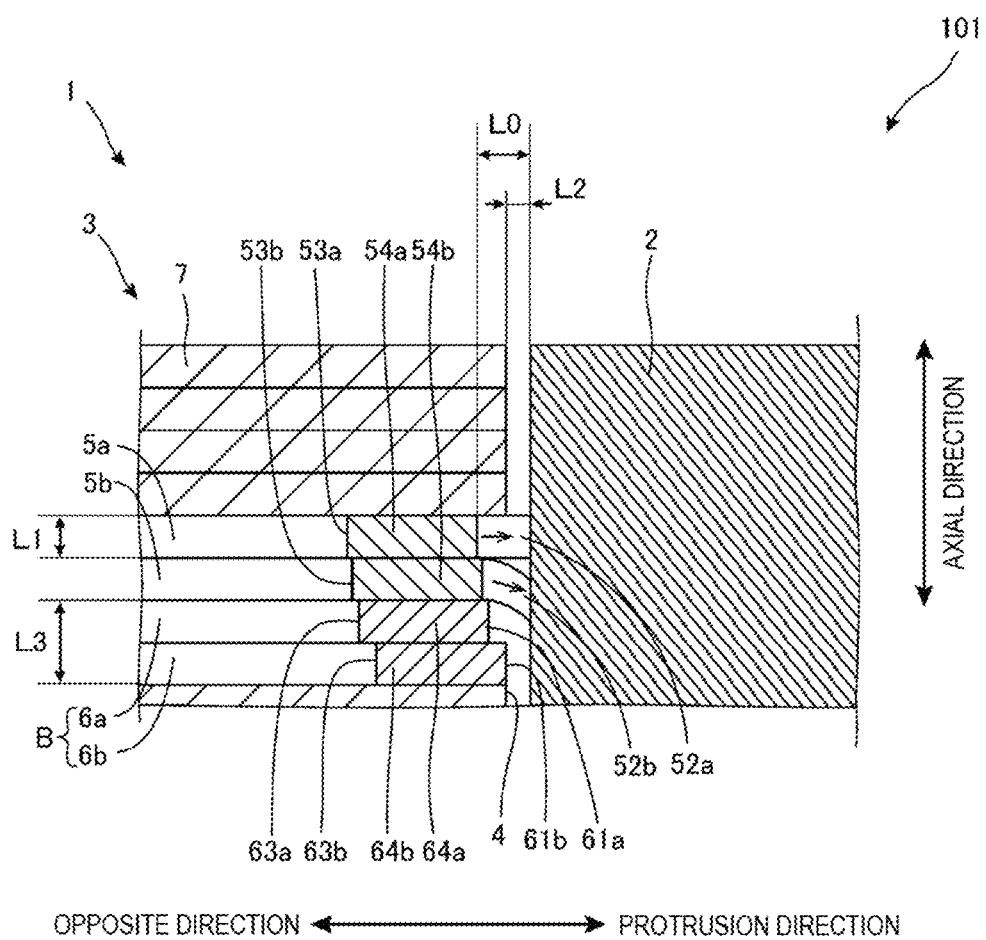
FIG. 16 is a view schematically showing a state in which the first protrusion portion is deformed when the magnet is inserted into the magnet insertion hole.

As shown in FIG. 15, the inner surface of the second insertion through hole 61a of the second core plate 6a pushed by the first protrusion portion 52b is deformed in the opposite direction to the protrusion direction of the first protrusion portion 52a. Due to this, a space in which the tip end portion of the first protrusion portion 52b deformed in the magnet insertion direction is movable is generated between the magnet 2 and the inner surface of the second insertion through hole 61a. As described above, the protrusion length L0 of the first protrusion portion 52b is shorter than the axial length L3 of the second core plate stacked portion B constituted by two second core plates 6a and 6b. Therefore, the first protrusion portion 52b deformed in the magnet insertion direction is not held between the magnet 2 and the inner surface of the magnet insertion hole 4. Therefore, as shown in FIG. 16, the magnet 2 can be appropriately held by the tip ends of the first protrusion portions 52a and 52b in a state where the magnet 2 is accommodated in the magnet insertion hole 4. Therefore, the magnet 2 can be prevented from being damaged. Since deformation of the first protrusion portion 52 in the magnet insertion direction is suppressed, the holding force of the magnet 2 by the first protrusion portion 52 can be improved.

Figure 17:
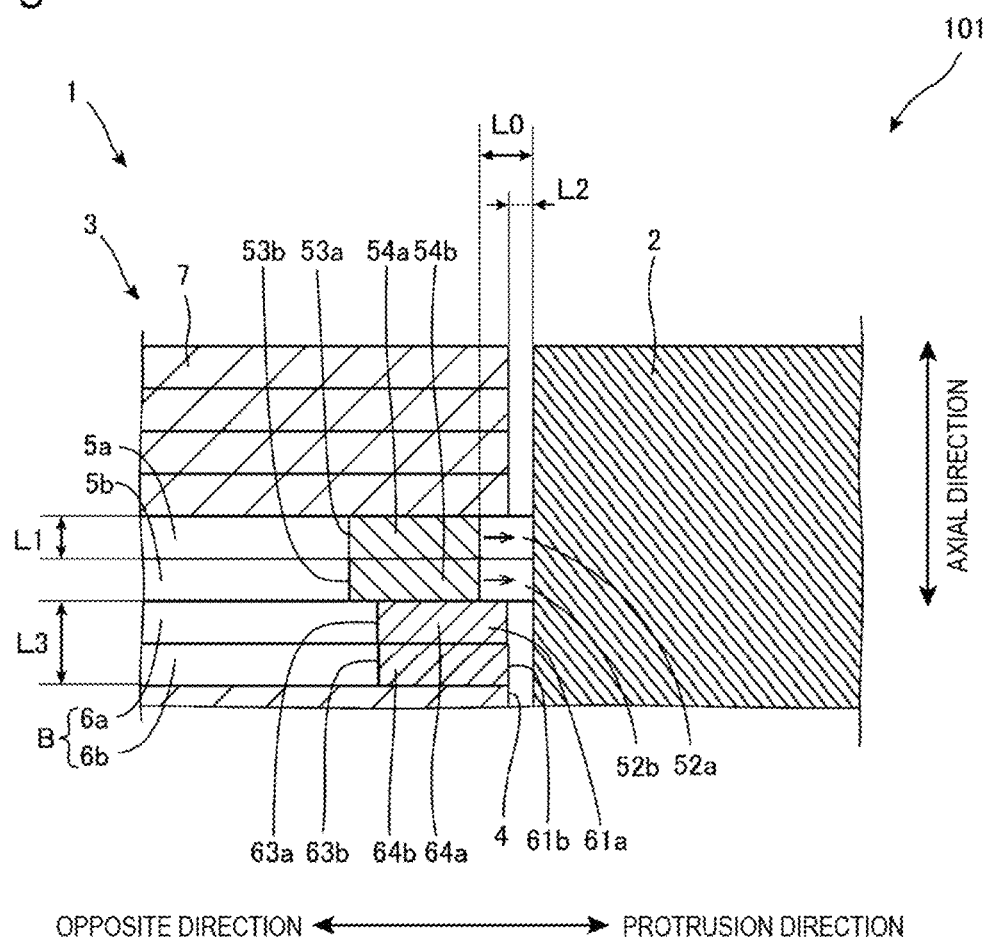
FIG. 17 is a view schematically showing a state in which the first protrusion portion is deformed when the magnet is inserted into the magnet insertion hole.

In the example shown in FIG. 16, the first protrusion portion 52b of the first core plate 5b stacked rearward in the magnet insertion direction with respect to the second core plate 6 pushes the magnet 2 by the tip end in a state of being deformed in the magnet insertion direction. However, as shown in FIG. 17, the first protrusion portion 52b may push the magnet 2 by the tip end without being deformed in the magnet insertion direction.

For example, when the first protrusion portion 52 is deformed in the opposite direction, a restoring force to return to a non-deformed state is generated in the first protrusion portion 52. When the inner surface of the second insertion through hole 61 of the second core plate 6 is deformed in the opposite direction, a restoring force in the protrusion direction is generated in the second deformation portion 64.

Therefore, as shown in FIG. 15, when the first protrusion portion 52b of the first core plate 5b pushes the inner surface of the second insertion through hole 61a in the opposite direction, a restoring force in the protrusion direction is generated in a second deformation portion 64a. The restoring force of the second deformation portion 64a in the protrusion direction pushes the first protrusion portion 52b rearward in the magnet insertion direction.

On the other hand, a restoring force to return to the non-deformed state is generated in the first protrusion portion 52b. Therefore, the deformation in the magnet insertion direction of the first protrusion portion 52b pushed rearward in the magnet insertion direction by the second core plate 6a is restored. As a result, as shown in FIG. 17, in a state where the magnet 2 is accommodated in the magnet insertion hole 4, the magnet 2 can be pushed by the tip ends of the first protrusion portions 52a and 52b.

As described above, the exemplary rotor 101 according to the present embodiment is a rotor including the rotor core 1 in a columnar shape having the plurality of core plates 3 stacked in the thickness direction and the magnet insertion hole 4 extending in the axial direction, and the magnet 2 inserted into the magnet insertion hole 4. The plurality of core plates 3 include the first core plate 5 and the second core plate 6 stacked frontward in the magnet insertion direction, which is the direction in which the magnet 2 is inserted into the magnet insertion hole 4, with respect to the first core plate 5. The first core plate 5 includes the first insertion through hole 51 penetrating the first core plate 5 in the thickness direction and constituting a part of the magnet insertion hole 4, the first protrusion portion 52 protruding toward the inside of the first insertion through hole 51, and the first deformation permission portion 53 located in a position in the opposite direction to the protrusion direction of the first protrusion portion 52 with respect to the first protrusion portion 52 as the rotor core 1 is viewed from the axial direction and permitting deformation of the first protrusion portion 52 in the opposite direction. The second core plate 6 includes the second insertion through hole 61 penetrating the second core plate 6 in the thickness direction and constituting a part of the magnet insertion hole 4, and the second deformation permission portion 63 located in a position in the opposite direction with respect to the first protrusion portion 52 as the rotor core 1 is viewed from the axial direction, and permitting the inner surface of the second insertion through hole 61 to be deformed in the opposite direction.

In the above configuration, the first protrusion portion 52 of the first core plate 5 protrudes to the region where the magnet 2 is accommodated in the magnet insertion hole 4. Therefore, when inserted into the magnet insertion hole 4, the magnet 2 comes into contact with the first protrusion portion 52 protruding toward the inside of the magnet insertion hole 4 in the first core plate 5. The first protrusion portion 52 in contact with the magnet 2 is deformed in the opposite direction to the protrusion direction of the first protrusion portion 52 by the first deformation permission portion 53 of the first core plate 5. Therefore, the magnet 2 can be held by the restoring force of the first protrusion portion 52. Therefore, the manufacturing process of the rotor 101 does not need to have a process for holding the magnet 2 separately from the process for inserting the magnet 2 into the magnet insertion hole 4.

The first protrusion portion 52 protruding toward the inside of the magnet insertion hole 4 may be deformed in the magnet insertion direction by the magnet 2 inserted into the magnet insertion hole 4. On the other hand, the first protrusion portion 52 deformed in the magnet insertion direction as described above can be prevented from being held between the magnet 2 and the inner surface of the magnet insertion hole 4 by the second deformation permission portion 63 of the second core plate 6.

That is, the second core plate 6 is located in the position in the opposite direction with respect to the first protrusion portion 52 as the rotor core 1 is viewed from the axial direction, and includes the second deformation permission portion 63 permitting the inner surface of the second insertion through hole 61 to be deformed in the opposite direction. Due to this, even when the first protrusion portion 52 is deformed in the magnet insertion direction, the first protrusion portion 52 is deformable in the opposite direction with respect to the second core plate 6. Since the second core plate 6 includes the second deformation permission portion 63, it is possible to improve the holding force of the magnet 2 while suppressing the first protrusion portion 52 from being deformed in the magnet insertion direction. Therefore, even when the first protrusion portion 52 is deformed in the magnet insertion direction, the magnet 2 can be appropriately held. Therefore, it is possible to prevent the first protrusion portion 52 from strongly pushing the magnet 2 and damaging the magnet 2.

In the present embodiment, the first core plate 5 includes the plurality of first protrusion portions 52 and the plurality of first deformation permission portions 53. The second core plate 6 includes the plurality of second deformation permission portions 63.

Due to this, the plurality of first protrusion portions 52 and the first deformation permission portion 53 can appropriately hold the magnet 2 inserted into the magnet insertion hole 4. Even when the plurality of first protrusion portions 52 are deformed in the magnet insertion direction, the plurality of second deformation permission portions 63 allow the first protrusion portions 52 to be deformable in the opposite direction. Therefore, the magnet 2 can be appropriately held. Therefore, the magnet 2 can be prevented from being damaged.

The exemplary motor 100 according to the present embodiment is an IPM motor including the rotor 101 having the above-described configuration and the stator 102 having the stator coil 106 and the stator core 105. With the above-described configuration, it is possible to provide the motor 100 that can hold the magnet 2 in the magnet insertion hole 4.

Figure 18:
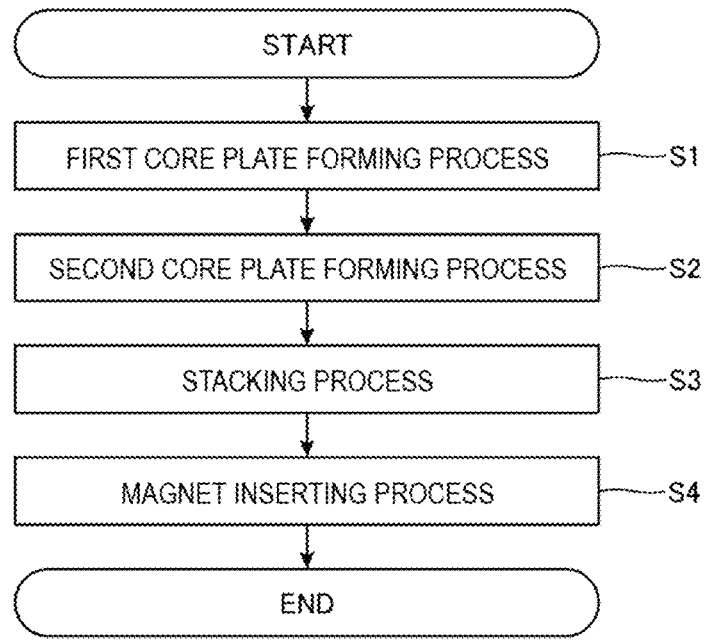
FIG. 18 is a flowchart showing a manufacturing method of a rotor.

A manufacturing method of the exemplary rotor 101 according to the first embodiment will be described with reference to FIGS. 11 to 18. As shown in FIG. 18, the manufacturing method of the rotor 101 includes a first core plate forming process S1, a second core plate forming process S2, a stacking process S3, and a magnet inserting process S4.

The first core plate forming process S1 is a process of forming the first core plate 5. The first core plate forming process S1 is to form the first core plate 5 by forming, on a steel plate, the first insertion through hole 51, the first protrusion portion 52, and the first deformation permission portion 53.

The second core plate forming process S2 is a process of forming the second core plate 6. The second core plate forming process S2 is to form the second core plate 6 by forming, on a steel plate, the second insertion through hole 61 and the second deformation permission portion 63.

The stacking process S3 is a process of stacking the first core plate 5, the second core plate 6, and the basic core plate 7 in a predetermined order. In the present embodiment, the plurality of basic core plates 7, the plurality of second core plates 6, the plurality of first core plates 5, and the plurality of basic core plates 7 are stacked in this order from the front side toward the rear side in the magnet insertion direction. Due to this, the rotor core 1 in a columnar shape having the plurality of core plates 3 stacked in the thickness direction and the magnet insertion hole 4 extending in the axial direction is formed.

The magnet insertion hole 4 of the rotor core 1 includes the first insertion through hole 51 of the first core plate 5, the second insertion through hole 61 of the second core plate 6, and the basic insertion through hole 71 of the basic core plate 7. In the rotor core 1, the first protrusion portion 52 protrudes toward the inside of the magnet insertion hole 4. Specifically, the tip end portion of the first protrusion portion 52 protrudes in a region in which the magnet 2 is accommodated in the magnet insertion hole 4 as the rotor core 1 is viewed from the axial direction.

The magnet inserting process S4 is a process of inserting the magnet 2 into the magnet insertion hole 4 constituted by the first core plate 5, the second core plate 6, and the basic core plate 7 and holding the magnet 2 in contact with the first protrusion portion 52 of the first core plate 5.

Specifically, as shown in FIGS. 11 to 17, by inserting the magnet 2 into the magnet insertion hole 4, the first protrusion portion 52 of the first core plate 5 is deformed in the opposite direction to the protrusion direction of the first protrusion portion 52 or in the magnet insertion direction. When the first protrusion portion 52 of the first core plate 5 is deformed in the magnet insertion direction, the inner surface of the second insertion through hole 61 of the second core plate 6 is deformed in the opposite direction.

When the first protrusion portion 52 is deformed in the opposite direction, the first protrusion portion fixes the magnet 2 to the inner surface of the magnet insertion hole 4 by the restoring force of the first deformation portion 54 of the first core plate 5. On the other hand, even when the first protrusion portion 52 is deformed in the magnet insertion direction, the first protrusion portion 52 is prevented from being held between the magnet 2 and the inner surface of the magnet insertion hole 4 by the second deformation permission portion 63 of the second core plate 6.

As described above, the manufacturing method of the exemplary rotor 101 according to the present embodiment is a manufacturing method of the rotor 101 including the rotor core 1 in a columnar shape having the plurality of core plates 3 stacked in the thickness direction and the magnet insertion hole 4 extending in the axial direction, and the magnet 2 inserted into the magnet insertion hole 4. The manufacturing method of the rotor 101 includes the first core plate forming process S1, the second core plate forming process S2, the stacking process S3, and the magnet inserting process S4.

The first core plate forming process S1 is to form the first core plate 5 by forming, on a steel plate, the first insertion through hole 51 penetrating the steel plate in the thickness direction to constitute a part of the magnet insertion hole 4, the first protrusion portion 52 protruding toward the inside of the first insertion through hole 51, and the first deformation permission portion 53 located in a position in the opposite direction to the protrusion direction of the first protrusion portion 52 with respect to the first protrusion portion 52 as the steel plate is viewed from the thickness direction and permitting deformation of the first protrusion portion 52 in the opposite direction.

The second core plate forming process S2 is to form the second core plate 6 by forming, on a steel plate, the second insertion through hole 61 penetrating the steel plate in the thickness direction to constitute a part of the magnet insertion hole 4, and the second deformation permission portion 63 located in a position in the opposite direction with respect to the first protrusion portion 52 as the rotor core 1 is viewed from the axial direction and permitting the inner surface of the second insertion through hole 61 to be deformed in the opposite direction.

The stacking process S3 is to stack the second core plate 6 frontward in the magnet insertion direction, which is the direction in which the magnet 2 is inserted into the magnet insertion hole 4 with respect to the first core plate 5.

The magnet inserting process S4 is to insert the magnet 2 into the magnet insertion hole 4 constituted by the first core plate 5 and the second core plate 6, and holding the magnet 2 in contact with the first protrusion portion 52 of the first core plate 5.

In the above-described manufacturing method, the first protrusion portion 52 of the first core plate 5 protrudes to the region where the magnet 2 is accommodated in the magnet insertion hole 4. Therefore, when inserted into the magnet insertion hole 4, the magnet 2 comes into contact with the first protrusion portion 52 protruding toward the inside of the magnet insertion hole 4 in the first core plate 5. The first protrusion portion 52 in contact with the magnet 2 is deformed in the opposite direction to the protrusion direction of the first protrusion portion 52 by the first deformation permission portion 53 of the first core plate 5. Therefore, the magnet 2 can be held by the restoring force of the first protrusion portion 52. Therefore, the manufacturing process of the rotor 101 does not need to have a process for holding the magnet 2 separately from the process for inserting the magnet 2 into the magnet insertion hole 4.

The first protrusion portion 52 protruding toward the inside of the magnet insertion hole 4 may be deformed in the magnet insertion direction by the magnet 2 inserted into the magnet insertion hole 4. On the other hand, the first protrusion portion 52 deformed in the magnet insertion direction as described above is prevented from being held between the magnet 2 and the inner surface of the magnet insertion hole 4 by the second deformation permission portion 63 of the second core plate 6.

That is, since the second core plate 6 is located in the position in the opposite direction with respect to the first protrusion portion 52 as the rotor core 1 is viewed from the axial direction and has the second deformation permission portion 63 permitting the inner surface of the second insertion through hole 61 to be deformed in the opposite direction, the first protrusion portion 52 can be deformed in the opposite direction with respect to the second core plate 6 even when the first protrusion portion 52 is deformed in the magnet insertion direction. Since the second core plate 6 includes the second deformation permission portion 63, it is possible to improve the holding force of the magnet 2 while suppressing the first protrusion portion 52 from being deformed in the magnet insertion direction. Therefore, even when the first protrusion portion 52 is deformed in the magnet insertion direction, the magnet 2 can be appropriately held. Therefore, it is possible to prevent the first protrusion portion 52 from strongly pushing the magnet 2 and damaging the magnet 2.

In the present embodiment, in the manufacturing method of the rotor 101, the first core plate 5 is formed, and then the second core plate 6 is formed. However, in the manufacturing method of the rotor 101, the second core plate 6 may be formed before the first core plate 5 is formed.

Next, a rotor core 201 according to the second embodiment will be described with reference to FIGS. 6, 19, and 20. In the rotor core 201 of the second embodiment, the configuration of a second core plate 206 is different from the configuration of the second core plate 6 of the first embodiment. Hereinafter, the same components as those of the first embodiment are denoted by the same reference signs, and the description thereof will be omitted. FIG. 20 is a view of a part of the second core plate 206 overlapping, in the axial direction, the first core plate 5 shown in FIG. 6 as viewed from the axial direction.

The rotor core 201 according to the present embodiment includes a plurality of core plates 203 and the plurality of magnet insertion holes 4. As shown in FIG. 19, the plurality of stacked core plates 203 include the first core plate 5, the second core plate 206, and the basic core plate 7.

Figure 19:
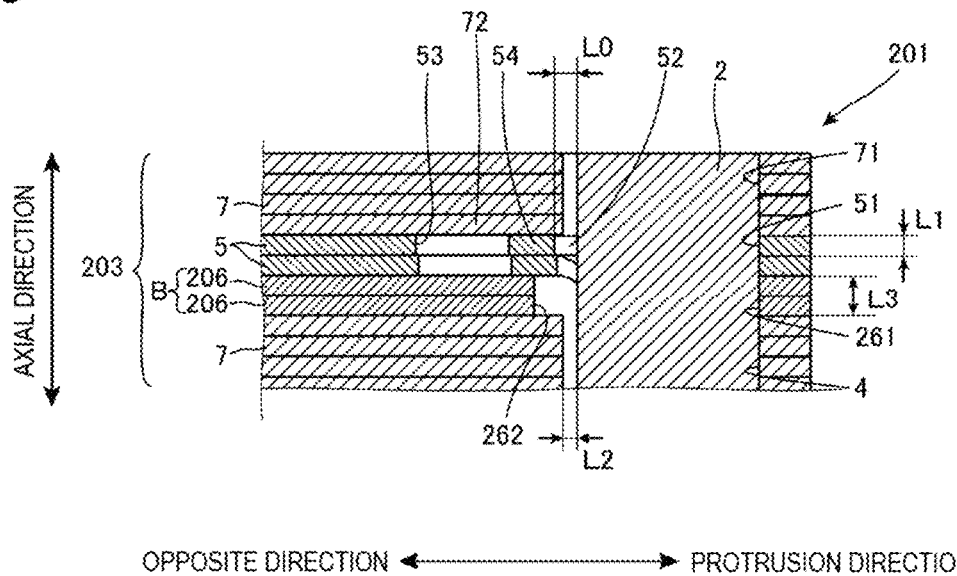
FIG. 19 is a sectional view of a rotor according to a second embodiment.
Figure 20:
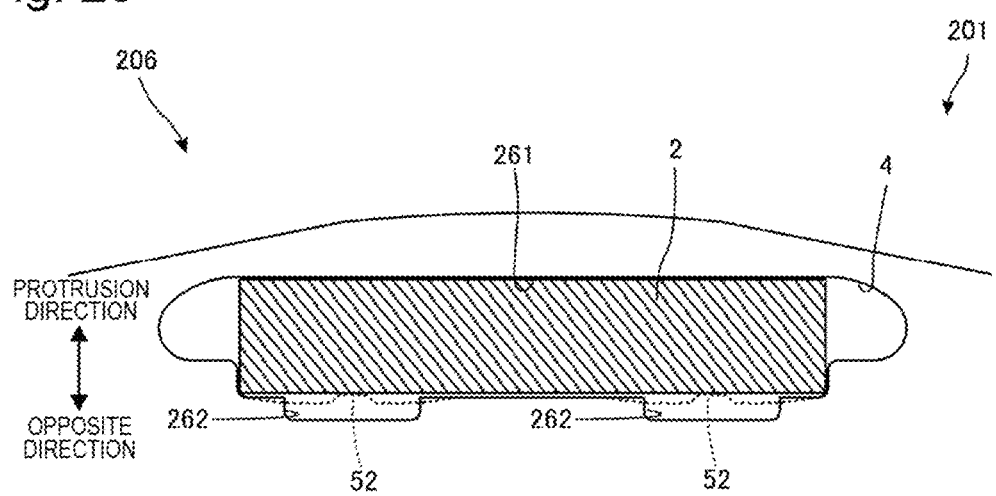
FIG. 20 is a partially enlarged view of a second core plate according to the second embodiment.

As shown in FIG. 19, in the present embodiment, the rotor core 201 includes the plurality of first core plates 5, the plurality of second core plates 206, and the plurality of basic core plates 7. The plurality of first core plates 5, the plurality of second core plates 206, and the plurality of basic core plates 7 are stacked in the order of the plurality of basic core plates 7, the plurality of first core plates 5, the plurality of second core plates 206, and the plurality of basic core plates 7 from the rear side toward the front side in the magnet insertion direction, which is a direction in which the magnet 2 is inserted into the magnet insertion hole 4. That is, in the present embodiment, the plurality of second core plates 206 are stacked frontward in the magnet insertion direction with respect to the first core plate 5 located on the foremost side in the magnet insertion direction among the plurality of first core plates 5. One second core plate 206 may be stacked frontward in the magnet insertion direction with respect to the first core plate 5.

The rotor core 201 includes the second core plate stacked portion B in which one or a plurality of second core plates 206 are stacked. In the present embodiment, the second core plate stacked portion B includes two second core plates 206.

The second core plate 206 includes a plurality of second insertion through holes 261 and a plurality of recess portions 262. The arrangement of the plurality of second insertion through holes 261 is similar to that of the second insertion through holes 61 in the second core plate 6 of the first embodiment. The configuration of the recess portion 262 with respect to one second insertion through hole 261 is the same. Therefore, the one second insertion through hole 261 and the recess portion 262 located with respect to the second insertion through hole 261 will be described below.

As shown in FIGS. 19 and 20, the second insertion through hole 261 penetrates the second core plate 206 in the thickness direction. The second insertion through hole 361 constitutes a part of the magnet insertion hole 4. The second insertion through hole 261 is located in a position overlapping the first insertion through hole 51 as the rotor core 201 is viewed from the axial direction.

As shown in FIG. 20, the recess portion 262 constitutes a part of the inner surface of the second insertion through hole 261. The recess portion 262 is recessed in an opposite direction to the protrusion direction of the first protrusion portion 52. The recess portion 262 is located in a position overlapping the first protrusion portion 52 as viewed from the axial direction. In the present embodiment, the second core plate 206 has two recess portions 262 for the one second insertion through hole 261. Each of the two recess portions 262 is located in a position overlapping the respective two first protrusion portions 52 of the first core plate 5 as viewed from the axial direction.

The second core plate stacked portion B has the axial length L3. The axial length L3 of the second core plate stacked portion B is longer than the protrusion length L0 of the first protrusion portion 52.

Also in the present embodiment, when the magnet 2 is inserted into the magnet insertion hole 4, the magnet 2 comes into contact with the first protrusion portion 52 of the first core plate 5. The second core plate 206 includes the recess portion 262 recessed in the opposite direction in the position overlapping the first protrusion portion 52 as viewed from the axial direction. Therefore, the first protrusion portion 52 of the first core plate 5 in contact with the magnet 2 is deformed in the magnet insertion direction and moves into the recess portion 262.

The thickness dimension L1 of the first protrusion portion 52 is larger than the gap dimension L2 between the magnet 2 and the inner surface of the magnet insertion hole 4, and the axial length L3 of the second core plate stacked portion B is longer than the protrusion length L0 of the first protrusion portion 52.

Therefore, even when the first protrusion portion 52 is deformed in the magnet insertion direction, the first protrusion portion 52 is not held between the magnet 2 and the inner surface of the magnet insertion hole 4. Therefore, the first protrusion portion 52 can easily move in the opposite direction to the protrusion direction of the first protrusion portion 52 with respect to the second core plate 206. Therefore, the magnet 2 can be appropriately held. Therefore, it is possible to prevent the magnet 2 from being damaged by the first protrusion portion 52.

In FIG. 19, the first protrusion portion 52b of the first core plate 5b is deformed in the magnet insertion direction. However, the first protrusion portion of the first core plate may extend in the protrusion direction similarly to the first embodiment.

As described above, the plurality of core plates 203 of the exemplary rotor core 201 according to the present embodiment includes the first core plate 5 and the second core plate 206 stacked frontward in the magnet insertion direction, which is the direction in which the magnet 2 is inserted into the magnet insertion hole 4, with respect to the first core plate 5. The second core plate 206 includes the second insertion through hole 261 penetrating the second core plate 206 in the thickness direction and constituting a part of the magnet insertion hole 4, and the recess portion 262 recessed in the opposite direction in the position overlapping the first protrusion portion 52 as the rotor core 201 is viewed from the axial direction.

In the present embodiment, the first core plate 5 includes the plurality of first protrusion portions 52 and the plurality of first deformation permission portions 53. The second core plate 206 has the plurality of recess portions 262.

Due to this, the magnet 2 inserted into the magnet insertion hole 4 can be held by the plurality of first protrusion portions 52 and the first deformation permission portion 53, and even when the plurality of first protrusion portions 52 are deformed in the magnet insertion direction, the magnet 2 can be appropriately held by the plurality of first protrusion portions 52 by the plurality of recess portions 262. Therefore, the magnet 2 can be prevented from being damaged.

The manufacturing method of the rotor having the rotor core 201 includes the first core plate forming process, the second core plate forming process, the stacking process, and the magnet inserting process. Since the first core plate forming process, the stacking process, and the magnet inserting process are the same as those in the first embodiment, the description thereof will be omitted.

In the present embodiment, the second core plate forming process is to form the second core plate 206 by forming, on a steel plate, the second insertion through hole 261 penetrating the steel plate in the thickness direction and constituting a part of the magnet insertion hole 4 and the recess portion 262 recessed in the opposite direction in the position overlapping the first protrusion portion 52 as the rotor core 201 is viewed from the axial direction.

The first protrusion portion 52 protruding toward the inside of the magnet insertion hole 4 may be deformed in the magnet insertion direction by the magnet 2 inserted into the magnet insertion hole 4. On the other hand, the first protrusion portion 52 deformed in the magnet insertion direction as described above is prevented from being held between the magnet 2 and the inner surface of the magnet insertion hole 4 by the recess portion 262 of the second core plate 206. Therefore, even when the first protrusion portion 52 is deformed in the magnet insertion direction, the magnet 2 can be appropriately held by the first protrusion portion 52.

Therefore, it is possible to prevent the first protrusion portion 52 from strongly pushing the magnet 2 and damaging the magnet 2.

Next, a rotor core 301 according to the third embodiment will be described with reference to FIGS. 6 and 21. In the rotor core 301 of the third embodiment, the configuration of a second core plate 306 is different from the configuration of the second core plate 6 of the first embodiment. Hereinafter, the same components as those of the first embodiment are denoted by the same reference signs, and the description thereof will be omitted. Hereinafter, for the sake of explanation, of two second core plates 306 stacked in the axial direction, each constituent element of the second core plate 306 on the rear side in the magnet insertion direction is denoted by reference sign a, and each constituent element of the second core plate 306 on the front side is denoted by a reference sign b to distinguish the two second core plates 306.

Figure 21:
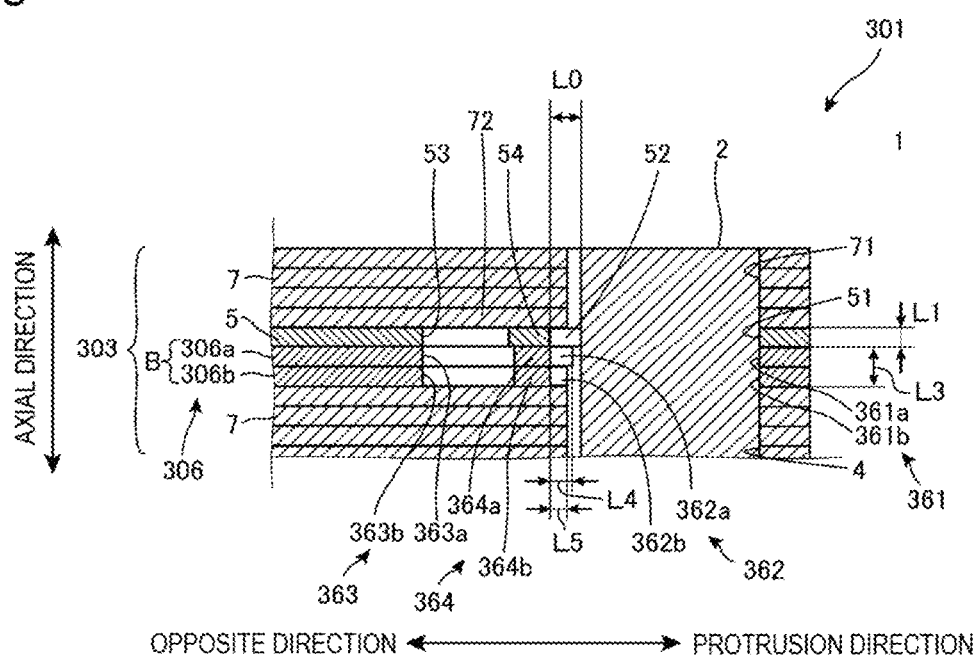
FIG. 21 is a sectional view of a rotor according to a third embodiment.

FIG. 21 is a view of a part of the second core plate 306 overlapping, in the axial direction, the first core plate 5 shown in FIG. 6 as viewed from the axial direction.

The rotor core 301 according to the present embodiment includes a plurality of core plates 303 and the plurality of magnet insertion holes 4. As shown in FIG. 21, the plurality of stacked core plates 303 include the first core plate 5, the second core plate 306, and the basic core plate 7.

As shown in FIG. 21, in the present embodiment, the rotor core 301 includes one first core plate 5, the plurality of second core plates 306, and the plurality of basic core plates 7. The one first core plate 5, the plurality of second core plates 306, and the plurality of basic core plates 7 are stacked in the order of the plurality of basic core plates 7, the first core plate 5, the two second core plates 306, and the plurality of basic core plates 7 from the rear side toward the front side in the magnet insertion direction, which is a direction in which the magnet 2 is inserted into the magnet insertion hole 4. That is, in the present embodiment, the plurality of second core plates 306 are stacked frontward in the magnet insertion direction with respect to the first core plate 5.

The second core plate 306 includes a plurality of the second insertion through holes 361, a plurality of second protrusion portions 362, a plurality of second deformation permission portions 363, and a plurality of second deformation portions 364. The arrangement of the plurality of second insertion through holes 361 is similar to that of the second insertion through holes 61 in the second core plate 6 of the first embodiment.

The second insertion through hole 361 penetrates the second core plate 306 in the thickness direction. The second insertion through hole 361 constitutes a part of the magnet insertion hole 4. The second insertion through hole 361 is located in a position overlapping the first insertion through hole 51 as the rotor core 301 is viewed from the axial direction.

The second protrusion portion 362 protrudes from the inner surface of the second insertion through hole 361 toward the inside of the magnet insertion hole 4. The tip end of the second protrusion portion 362 in the protrusion direction does not push the magnet 2. The second protrusion portion 362 overlaps the first protrusion portion 52 of the first core plate 5 as viewed from the axial direction.

The second deformation permission portion 363 is located in a position in an opposite direction to the protrusion direction of the second protrusion portion 362. The second deformation permission portion 363 permits the inner surface of the second insertion through hole 361 to be deformed in the opposite direction.

Other components of the second deformation permission portion 363 and the components of the second deformation portion 364 are similar to the components of the second deformation permission portion 63 and the second deformation portion 64 of the first embodiment. Therefore, description of the second deformation permission portion 363 and the second deformation portion 364 will be omitted.

In the present embodiment, of the two second core plates 306, the protrusion length of a second protrusion portion 362a of a second core plate 306a stacked rearward in the magnet insertion direction and the protrusion length of a second protrusion portion 362b of a second core plate 306b stacked frontward in the magnet insertion direction are different from each other. Specifically, the protrusion length of the second protrusion portion 362a is L4. The protrusion length of the second protrusion portion 362b is L5.

The protrusion length L4 of the second protrusion portion 362a and the protrusion length L5 of the second protrusion portion 362b are smaller than the protrusion length L0 of the first protrusion portion 52. The protrusion length L5 is smaller than the protrusion length L4. That is, the protrusion lengths L4 and L5 of the second protrusion portion 362 of the second core plate 306 decrease from the rear side in the magnet insertion direction toward the front side in the magnet insertion direction. In the present embodiment, the protrusion length L5 of the second protrusion portion 362b is a length in which the tip end of the second protrusion portion 362b does not come into contact with the magnet 2.

The tip end of the second protrusion portion 362b may be in contact with the magnet 2. The tip end of the second protrusion portion 362b may be recessed or may protrude with respect to the inner surface of the basic insertion through hole 71 of the basic core plate 7.

Similarly to the first and second embodiments, the first protrusion portion 52 of the first core plate 5 protrudes toward the inside of the magnet insertion hole 4. Therefore, when the magnet 2 is inserted into the magnet insertion hole 4, the first protrusion portion 52 is pushed by the magnet 2.

The first protrusion portion 52 of the first core plate 5 in contact with the magnet 2 is deformed in the magnet insertion direction. The protrusion length L4 of the second protrusion portion 362a located frontward in the magnet insertion direction with respect to the first protrusion portion 52 is smaller than the protrusion length L0 of the first protrusion portion 52. Therefore, the first protrusion portion 52 deformed in the magnet insertion direction pushes the tip end of the second protrusion portion 362a in the opposite direction to the protrusion direction of the second protrusion portion 362a. Therefore, the first protrusion portion 52 is not held between the magnet 2 and the inner surface of the magnet insertion hole 4.

The second protrusion portion 362a of the second core plate 306a pushed by the first protrusion portion 52 is deformed in the magnet insertion direction. The protrusion length L5 of the second protrusion portion 362b located frontward in the magnet insertion direction with respect to the second protrusion portion 362a is smaller than the protrusion length L4 of the second protrusion portion 362a. Therefore, the second protrusion portion 362a deformed in the magnet insertion direction pushes the tip end of the second protrusion portion 362b in the opposite direction to the protrusion direction of the second protrusion portion 362b. Therefore, the second protrusion portion 362a is not held between the magnet 2 and the inner surface of the magnet insertion hole 4.

The second protrusion portion 362b pushed by the second protrusion portion 362a is deformed in the magnet insertion direction. In the present embodiment, the basic core plate 7 is located frontward in the magnet insertion direction with respect to the second protrusion portion 362b. Therefore, the second protrusion portion 362b is suppressed from being deformed in the magnet insertion direction.

As described above, in the present embodiment, the second core plates 306a and 306b stacked frontward in the magnet insertion direction with respect to the first core plate 5 have the second protrusion portions 362a and 362b having a protrusion length smaller than the protrusion length L0 of the first protrusion portion 52. Due to this, the first protrusion portion 52 deformed in the magnet insertion direction is not held between the magnet 2 and the inner surface of the magnet insertion hole 4. Therefore, the magnet 2 can be appropriately held. Therefore, the magnet 2 can be prevented from being damaged.

In the present embodiment, the two second core plates 306 having the second protrusion portion 362 are stacked frontward in the magnet insertion direction with respect to the one first core plate 5. However, one second core plate having the second protrusion portion may be stacked frontward in the magnet insertion direction with respect to a plurality of first core plates. A plurality of second core plates having the second protrusion portion may be stacked frontward in the magnet insertion direction with respect to a plurality of first core plates.

That is, in the present embodiment, the plurality of core plates 303 include at least one of the plurality of first core plate 5 and the plurality of second core plate 306. The second core plate 306 includes the second protrusion portion 362 protruding toward the inside of the second insertion through hole 361 and overlapping the first protrusion portion 52 as the rotor core 301 is viewed from the axial direction, and the second deformation permission portion 363 located in a position in an opposite direction to the protrusion direction of the second protrusion portion 362 as the rotor core 301 is viewed from the axial direction and permitting the inner surface of the second insertion through hole 361 to be deformed in the opposite direction. The protrusion lengths L4 and L5 of the second protrusion portion 362 are smaller than the protrusion length L0 of the first protrusion portion of the first core plate 5.

Due to this, even when the first protrusion portion 52 of the first core plate 5 is deformed in the magnet insertion direction when the magnet is inserted into the magnet insertion hole 4, the protrusion length L4 of the second protrusion portion 362a of the second core plate 306a stacked frontward in the magnet insertion direction as the rotor core 301 is viewed from the axial direction is smaller than the protrusion length L0 of the first protrusion portion 52 stacked rearward in the magnet insertion direction with respect to the second protrusion portion 362a, and therefore the first protrusion portion 52 stacked rearward is movable in the opposite direction to the protrusion direction. Even when the second protrusion portion 362a of the second core plate 306a is deformed in the magnet insertion direction, the protrusion length L5 of the second protrusion portion 362b of the second core plate 306b stacked frontward in the magnet insertion direction as the rotor core 301 is viewed from the axial direction is smaller than the protrusion length L4 of the second protrusion portion 362a stacked rearward in the magnet insertion direction with respect to the second protrusion portion 362b, and therefore the second protrusion portion 362a stacked rearward is movable in the opposite direction to the protrusion direction. Therefore, the magnet 2 can be appropriately held. Therefore, it is possible to prevent the magnet 2 from being damaged by the first protrusion portion 52.

As described above, the rotor 101 according to the first to third embodiments has the following features.

(1) The rotor according to the embodiment includes: a rotor core in a columnar shape having a plurality of core plates stacked in a thickness direction and a magnet insertion hole extending in an axial direction; and a magnet inserted into the magnet insertion hole. The plurality of core plates include a first core plate, and a second core plate stacked frontward in a magnet insertion direction in which the magnet is inserted into the magnet insertion hole with respect to of the first core plate. The first core plate includes a first insertion through hole penetrating the first core plate in a thickness direction to constitute a part of the magnet insertion hole, a first protrusion portion protruding toward an inside of the first insertion through hole, and a first deformation permission portion located in a position in an opposite direction to a protrusion direction of the first protrusion portion with respect to the first protrusion portion when the rotor core is viewed from the axial direction and permits deformation of the first protrusion portion in the opposite direction. The second core plate includes a second insertion through hole penetrating the second core plate in a thickness direction to constitute a part of the magnet insertion hole, and at least one of a recess portion recessed in the opposite direction in a position overlapping the first protrusion portion when the rotor core is viewed from the axial direction, and a second deformation permission portion that is located at a position in the opposite direction with respect to the first protrusion portion when the rotor core is viewed from the axial direction and permits an inner surface of the second insertion through hole to be deformed in the opposite direction.

(2) In the rotor according to (1), the rotor core includes a second core plate stacked portion in which one or a plurality of the second core plates are stacked. A protrusion length of the first protrusion portion is shorter than an axial length of the second core plate stacked portion.

(3) In the rotor according to (1) or (2), the second deformation permission portion is located in a position overlapping the first deformation permission portion as the rotor core is viewed from the axial direction.

(4) In the rotor according to (3), the second insertion through hole is located in a position overlapping the first insertion through hole as the rotor core is viewed from an axial direction.

(5) In the rotor according to any one of (1) to (4), the first core plate includes a plurality of the first protrusion portions, and a plurality of the first deformation permission portions. The second core plate includes at least one of a plurality of the recess portions and a plurality of the second deformation permission portions.

(6) In the rotor according to any one of (1) to (5), the plurality of core plates include at least one of a plurality of the first core plates and a plurality of the second core plates. The second core plate includes a second protrusion portion protruding toward an inside of the second insertion through hole and overlapping the first protrusion portion as the rotor core is viewed from an axial direction, and a second deformation permission portion located in a position in an opposite direction to a protrusion direction of the second protrusion portion as the rotor core is viewed from the axial direction, and permitting an inner surface of the second insertion through hole to be deformed in the opposite direction. A protrusion length of the second protrusion portion is smaller than a protrusion length of the first protrusion portion of the first core plate.

(7) In the rotor according to (6), the protrusion length of the second protrusion portion of the second core plate decreases from a rear side in the magnet insertion direction toward a front side in the magnet insertion direction.

(8) An IPM motor according to the embodiment includes the rotor according to any one of (1) to (7), and a stator including a stator coil and a stator core.

(9) The rotor manufacturing method according to the embodiment is a manufacturing method of a rotor including a rotor core in a columnar shape having a plurality of core plates stacked in a thickness direction and a magnet insertion hole extending in an axial direction, and a magnet inserted into the magnet insertion hole. The manufacturing method includes: a first core plate forming process of forming a first core plate by forming, on a steel plate, a first insertion through hole penetrating the steel plate in a thickness direction to constitute a part of the magnet insertion hole, a first protrusion portion protruding toward an inside of the first insertion through hole, and a first deformation permission portion located in a position in an opposite direction to a protrusion direction of the first protrusion portion with respect to the first protrusion portion when the steel plate is viewed from the thickness direction and permitting deformation of the first protrusion portion in the opposite direction; a second core plate forming process of forming a second core plate by forming, on a steel plate, a second insertion through hole penetrating the steel plate in a thickness direction to constitute a part of the magnet insertion hole, and at least one of a recess portion recessed in the opposite direction in a position overlapping the first protrusion portion when the rotor core is viewed in the axial direction and a second deformation permission portion located in a position in the opposite direction with respect to the first protrusion portion when the rotor core is viewed in the axial direction and permitting an inner surface of the second insertion through hole to be deformed in the opposite direction; a stacking process of stacking the second core plate frontward in a magnet insertion direction that is a direction in which the magnet is inserted into the magnet insertion hole with respect to the first core plate; and a magnet inserting process of inserting the magnet into the magnet insertion hole constituted with the first core plate and the second core plate and holding the magnet in contact with the first protrusion portion of the first core plate.

While the embodiments of the present invention have been described above, the above embodiments are merely examples for implementing the present invention. Accordingly, the present invention is not limited to the embodiments described above, and the embodiments described above may be appropriately modified and implemented without departing from the scope of the present invention.

In each of the above embodiments, the magnet 2 has a cuboid shape. However, the magnet may have a shape other than the cuboid. The magnet may have any shape that can be inserted into the magnet insertion hole and can be held by the first protrusion portion. For example, the magnet may be a polygonal prism other than a quadrangular prism.

In the first and second embodiments, the two first core plates 5 are stacked rearward in the magnet insertion direction with respect to the second core plate stacked portion B. However, one first core plate may be stacked rearward in the magnet insertion direction with respect to the second core plate stacked portion, or three or more first core plates may be stacked.

In each of the above embodiments, the second core plate stacked portion B includes the two second core plates 6, 206, or 306. However, the second core plate stacked portion B may include one second core plate, or may include three or more second core plates.

In each of the above embodiments, the basic core plate 7 is stacked rearward with respect to the first core plate 5 stacked rearward in the magnet insertion direction. However, a core plate other than the basic core plate may be stacked rearward.

In each of the above embodiments, the basic core plate 7 is stacked frontward with respect to the second core plate 6, 206, or 306 stacked frontward in the magnet insertion direction. However, a core plate other than the basic core plate may be stacked frontward.

In each of the above embodiments, the first protrusion portion 52 has a trapezoidal shape as the first core plate 5 is viewed from the axial direction. However, the shape of the first protrusion portion as the first core plate is viewed from the axial direction may be, for example, a rectangular shape or a semicircular shape, and is not limited to the trapezoidal shape.

In each of the above embodiments, the first core plate 5 includes the two first protrusion portions 52, the two first deformation permission portions 53, and the two first deformation portions 54 for the one first insertion through hole 51. However, the first core plate may include one first protrusion portion, one first deformation permission portion, and one first deformation portion with respect to one first insertion through hole, or may include three or more first protrusion portions, first deformation permission portions, and first deformation portions.

In each of the above embodiments, the first core plate 5 includes the first protrusion portion 52 with respect to all the first insertion through holes 51. However, the first core plate may include the first protrusion portion with respect to some of the first insertion through holes.

In each of the above embodiments, the first core plate 5 includes the first deformation permission portion 53 with respect to all the first insertion through holes 51. However, the first core plate may include the first deformation permission portion with respect to some of the first insertion through holes.

In each of the above embodiments, the first core plate 5 includes the first deformation portion 54 with respect to all the first insertion through holes 51. However, the first core plate may include the first deformation portion with respect to some of the first insertion through holes.

In each of the above embodiments, the first deformation permission portion 53 has a rectangular shape. However, the first deformation permission portion may have a shape other than the rectangle. The first deformation permission portion may have any shape that can cause the first deformation portion to be deformed in an opposite direction to the protrusion direction of the first protrusion portion.

In each of the above embodiments, the plurality of first deformation permission portions 53 have the same shape. However, some of the deformation permission portions may have different shapes.

In the first and third embodiments, the second core plate 6 or 306 includes the two second deformation permission portions 63 or 363 and the two second deformation portions 64 or 364 with respect to the one second insertion through hole 61 or 361, respectively. However, the second core plate may include one second deformation permission portion and one second deformation portion with respect to one second insertion through hole, or may include three or more second deformation permission portions and second deformation portions.

In the second embodiment, the second core plate 206 has two recess portions 262 for the one second insertion through hole 261. However, the second core plate may include one recess portion with respect to one second insertion through hole, or may include three or more recess portions.

In the second embodiment, the second core plate 206 includes the recess portion 262 recessed in the opposite direction to the protrusion direction of the first protrusion portion 52 in the position overlapping each of the plurality of first protrusion portions 52 of the first core plate 5 as viewed from the axial direction. However, the second core plate may include one recess portion overlapping the plurality of first protrusion portions as viewed from the axial direction. Of the inner surface of the second insertion through hole of the second core plate, the entire inner surface overlapping the first protrusion portion may be located in the position in the opposite direction.

In the third embodiment, the second core plate 306 includes the two second protrusion portions 362 with respect to the one second insertion through hole 61. However, the second core plate may include one second protrusion portion with respect to one second insertion through hole, or may include three or more second protrusion portions.

In the first and third embodiments, the second core plate 6 or 306 includes the second deformation permission portions 63 or 363 with respect to all the second insertion through holes 61 or 361. However, the second core plate may include the second deformation permission portion with respect to some of the second insertion through holes.

In the first and third embodiments, the second core plate 6 or 306 includes the second deformation portion 64 or 364 with respect to all the second insertion through holes 61 or 361. However, the second core plate may include the second deformation portion with respect to some of the second insertion through holes.

In the first and third embodiments, the second deformation permission portion 63 or 363 has a rectangular shape. However, the second deformation permission portion may have a shape other than the rectangle. The second deformation permission portion may have any shape that can cause the second deformation portion to be deformed in an opposite direction to the protrusion direction of the second protrusion portion.

In the first and third embodiments, the second deformation permission portion 63 or 363 has the same shape. However, some of the deformation permission portions may have different shapes.

In the second embodiment, the second core plate 206 includes the recess portions 262 with respect to all the second insertion through holes 261. However, the second core plate may include the recess portion with respect to some of the second insertion through holes.

In the third embodiment, the second core plate 306 includes the second protrusion portion 362 with respect to all the second insertion through holes 361. However, the second core plate may include the second protrusion portion with respect to some of the second insertion through holes.

In the third embodiment, the protrusion length of the second protrusion portion 362 of the second core plate 306 decreases from the rear side in the magnet insertion direction toward the front side in the magnet insertion direction. However, the protrusion length of the second protrusion portion of the second core plate may be the same. The protrusion length of the second protrusion portion of the second core plate is only required to be smaller than the protrusion length of the first protrusion portion of the first core plate.

In the third embodiment, the protrusion lengths of the second protrusion portions 362 of the plurality of second core plates 306 included in the second core plate stacked portion B decrease from the rear side in the magnet insertion direction toward the front side in the magnet insertion direction. However, among the second core plates included in the second core plate stacked portion B, the protrusion length of the second core plate stacked on the foremost side in the magnet insertion direction only needs to be the smallest, and the protrusion length of the second core plate stacked on the rearmost side in the magnet insertion direction only needs to be smaller than the protrusion length of the first protrusion portion of the first core plate stacked rearward in the magnet insertion direction with respect to the second core plate.

In the first embodiment, the second core plate 6 includes the second deformation permission portion 63 located in a position in the opposite direction to the protrusion direction of the first protrusion portion 52 with respect to the first protrusion portion 52 as the rotor core 1 is viewed from the axial direction, and permitting the inner surface of the second insertion through hole 61 to be deformed in the opposite direction, and does not include the recess portion. In the second embodiment, the second core plate 206 includes the recess portion 262 recessed in the opposite direction in the position overlapping the first protrusion portion 52 as the rotor core 201 is viewed from the axial direction, and does not include the second deformation permission portion. However, the second core plate may include both the second deformation permission portion and the recess portion. That is, the second core plate may include at least one of the recess portion and the second deformation permission portion.

In each of the above embodiments, the rotor core 1, 201, or 301 includes the plurality of second core plates 6, 206, or 306, respectively, having the same configuration. However, the rotor core may include the second core plate of the first embodiment, the second core plate of the second embodiment, and the second core plate of the third embodiment. The rotor core may include at least one of the second core plate of the first embodiment, the second core plate of the second embodiment, and the second core plate of the third embodiment.

In the first and third embodiments, the second deformation permission portion 63 or 363 is located in a position overlapping the first deformation permission portion 53 as the rotor core is viewed from the axial direction. However, the first deformation permission portion and the second deformation permission portion need not overlap each other as viewed from the axial direction.

The present invention can be used for a rotor of a motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor comprising:
a rotor core in a columnar shape having a plurality of core plates stacked in a thickness direction and a magnet insertion hole extending in an axial direction; and
a magnet inserted into the magnet insertion hole, wherein
the plurality of core plates include
a first core plate, and
a second core plate stacked frontward in a magnet insertion direction that is a direction in which the magnet is inserted into the magnet insertion hole with respect to of the first core plate,
the first core plate includes
a first insertion through hole penetrating the first core plate in a thickness direction to constitute a part of the magnet insertion hole,
a first protrusion portion protruding toward an inside of the first insertion through hole, and
a first deformation permission portion located in a position in an opposite direction to a protrusion direction of the first protrusion portion with respect to the first protrusion portion when the rotor core is viewed from the axial direction and permitting deformation of the first protrusion portion in the opposite direction, and
the second core plate includes
a second insertion through hole penetrating the second core plate in a thickness direction to constitute a part of the magnet insertion hole, and
at least one of a recess portion recessed in the opposite direction in a position overlapping the first protrusion portion when the rotor core is viewed from the axial direction, and a second deformation permission portion that is located at a position in the opposite direction with respect to the first protrusion portion when the rotor core is viewed from the axial direction and permits an inner surface of the second insertion through hole to be deformed in the opposite direction.

2. The rotor according to claim 1, wherein
the rotor core includes a second core plate stacked portion in which one or a plurality of the second core plates are stacked, and
a protrusion length of the first protrusion portion is shorter than the axial length of the second core plate stacked portion.

3. The rotor according to claim 1, wherein the second deformation permission portion is located in a position overlapping the first deformation permission portion as the rotor core is viewed from the axial direction.

4. The rotor according to claim 3, wherein the second insertion through hole is located in a position overlapping the first insertion through hole as the rotor core is viewed from the axial direction.

5. The rotor according to claim 1, wherein
the first core plate includes
a plurality of the first protrusion portions, and
a plurality of the first deformation permission portions, and
the second core plate includes at least one of a plurality of the recess portions and a plurality of the second deformation permission portions.

6. The rotor according to claim 1, wherein
the plurality of core plates include at least one of a plurality of the first core plates and a plurality of the second core plates,
the second core plate includes
a second protrusion portion protruding toward an inside of the second insertion through hole and overlapping the first protrusion portion as the rotor core is viewed from the axial direction, and
a second deformation permission portion located in a position in an opposite direction to a protrusion direction of the second protrusion portion as the rotor core is viewed from the axial direction, and permitting an inner surface of the second insertion through hole to be deformed in the opposite direction, and
a protrusion length of the second protrusion portion is smaller than a protrusion length of the first protrusion portion of the first core plate.

7. The rotor according to claim 6, wherein the protrusion length of the second protrusion portion of the second core plate decreases from a rear side in the magnet insertion direction toward a front side in the magnet insertion direction.

8. An IPM motor comprising:
the rotor according to claim 1; and
a stator including a stator coil and a stator core.

9. A manufacturing method of a rotor including a rotor core in a columnar shape having a plurality of core plates stacked in a thickness direction and a magnet insertion hole extending in an axial direction, and a magnet inserted into the magnet insertion hole, the manufacturing method comprising:
a first core plate forming process of forming a first core plate by forming, on a steel plate, a first insertion through hole penetrating the steel plate in a thickness direction to constitute a part of the magnet insertion hole, a first protrusion portion protruding toward an inside of the first insertion through hole, and a first deformation permission portion located in a position in an opposite direction to a protrusion direction of the first protrusion portion with respect to the first protrusion portion when the steel plate is viewed from the thickness direction and permitting deformation of the first protrusion portion in the opposite direction;
a second core plate forming process of forming a second core plate by forming, on a steel plate, a second insertion through hole penetrating the steel plate in a thickness direction to constitute a part of the magnet insertion hole, and at least one of a recess portion recessed in the opposite direction in a position overlapping the first protrusion portion when the rotor core is viewed in the axial direction and a second deformation permission portion located in a position in the opposite direction with respect to the first protrusion portion when the rotor core is viewed in the axial direction and permitting an inner surface of the second insertion through hole to be deformed in the opposite direction;
a stacking process of stacking the second core plate frontward in a magnet insertion direction that is a direction in which the magnet is inserted into the magnet insertion hole with respect to the first core plate; and a magnet inserting process of inserting the magnet into the magnet insertion hole constituted with the first core plate and the second core plate and holding the magnet in contact with the first protrusion portion of the first core plate.

\* \* \* \* \*